(12) United States Patent
Töngi et al.

(10) Patent No.: US 10,138,152 B2
(45) Date of Patent: Nov. 27, 2018

(54) LOCK RING MOUNTING ARRANGEMENT FOR BLOW HEADS

(71) Applicant: Emhart Glass S.A., Cham (CH)

(72) Inventors: Sebastian Töngi, Merenschwand (CH); Alexander Frunz, Cham (CH)

(73) Assignee: Emhart Glass S.A., Cham (CH)

( * ) Notice: Subject to any disclaimer, the term of this patent is extended or adjusted under 35 U.S.C. 154(b) by 0 days.

(21) Appl. No.: 15/645,126

(22) Filed: Jul. 10, 2017

(65) Prior Publication Data

US 2017/0305776 A1    Oct. 26, 2017

Related U.S. Application Data

(62) Division of application No. 13/893,427, filed on May 14, 2013, now Pat. No. 9,701,559.

(51) Int. Cl.
*C03B 9/16* (2006.01)
*C03B 9/36* (2006.01)

(52) U.S. Cl.
CPC ............ *C03B 9/165* (2013.01); *C03B 9/3618* (2013.01); *C03B 9/3663* (2013.01)

(58) Field of Classification Search
CPC ........ C03B 9/3618; C03B 9/36; C03B 9/3663
See application file for complete search history.

(56) References Cited

U.S. PATENT DOCUMENTS

| | | | | |
|---|---|---|---|---|
| 3,472,642 A * | 10/1969 | Irwin | ...................... | C03B 9/165 65/232 |
| 4,033,744 A | 7/1977 | Earl | | |
| 4,610,713 A * | 9/1986 | Clegg | ................... | C03B 9/3618 65/300 |
| 5,290,335 A * | 3/1994 | Stewart | ................. | C03B 9/1932 403/306 |
| 5,597,260 A | 1/1997 | Peterson | | |
| 6,322,284 B1 | 11/2001 | Bonardo et al. | | |
| 6,530,682 B2 * | 3/2003 | Wu | .......................... | F16B 7/20 285/401 |
| 6,880,806 B2 * | 4/2005 | Haikawa | ............... | F16K 31/041 137/385 |
| 6,971,847 B2 | 12/2005 | Tiemann | | |
| 8,024,944 B2 | 9/2011 | Shue | | |
| 2004/0109724 A1 * | 6/2004 | Tiemann | ................. | F01D 9/042 403/349 |
| 2010/0284767 A1 * | 11/2010 | Shue | ....................... | C03B 9/165 411/553 |

FOREIGN PATENT DOCUMENTS

| | | |
|---|---|---|
| DE | 19713281 | 10/1998 |
| FR | 2310318 | 12/1976 |
| JP | 2011143650 | 7/2011 |
| JP | 2012526958 | 11/2012 |

* cited by examiner

*Primary Examiner* — Jason L Lazorcik
(74) *Attorney, Agent, or Firm* — Richard Boerner; Van Deuren P.C.

(57) ABSTRACT

A blow head mounting arrangement for use to facilitate installation and removal of a blow head from a blow head mounting member. The blow head has a first engagement member for removable engagement with a second engagement member to removably attach the blow head to the blow head mounting member. Once engaged, the blow head is retained on the blow head mounting member by rotating the blow head into a locked position in which it is retained until it is rotated in the opposite direction by a locking mechanism.

12 Claims, 27 Drawing Sheets

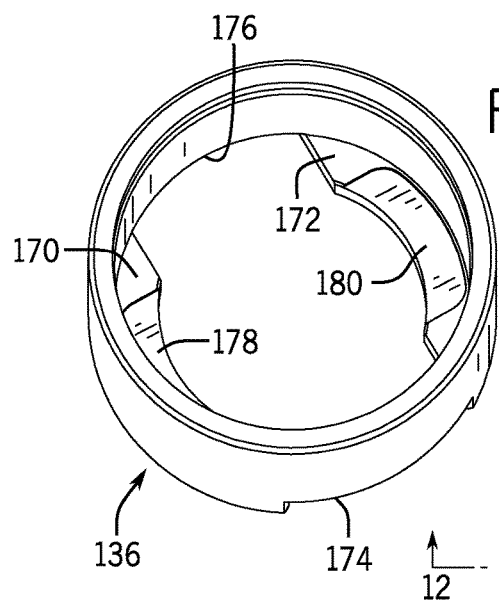
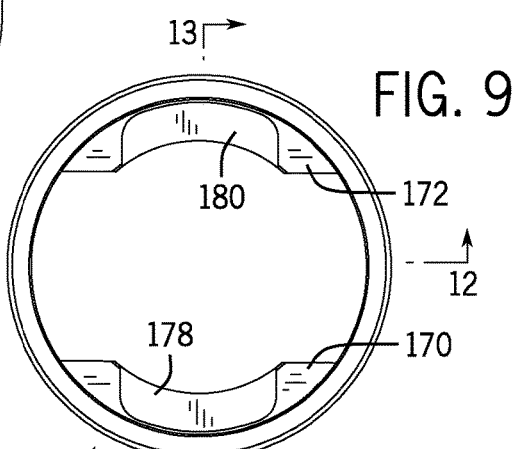
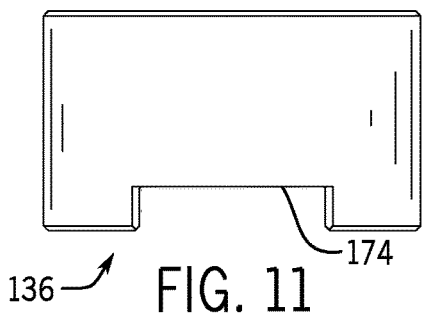
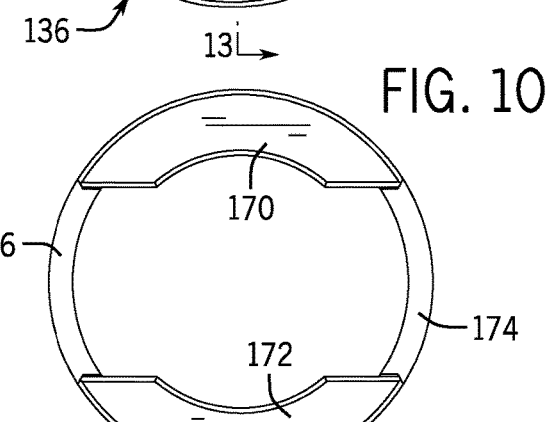
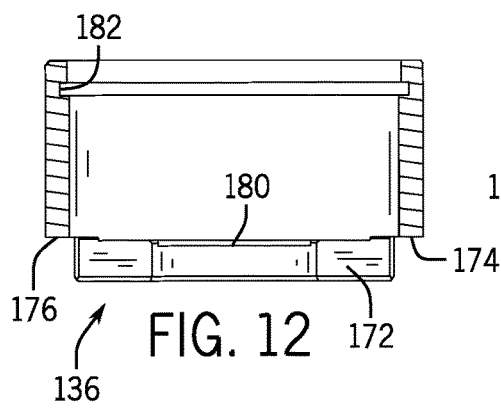
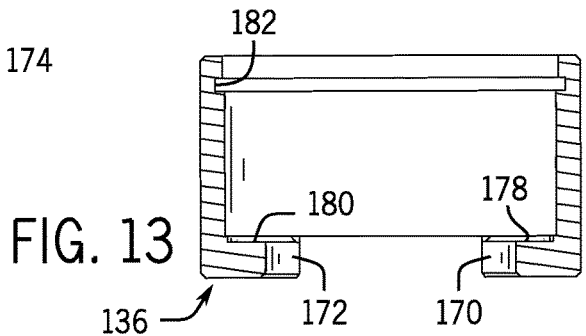

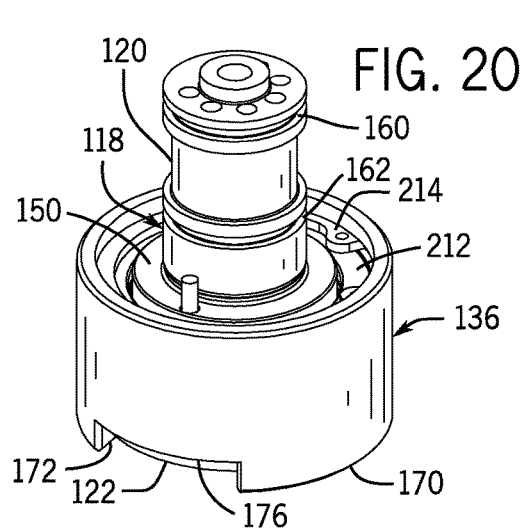
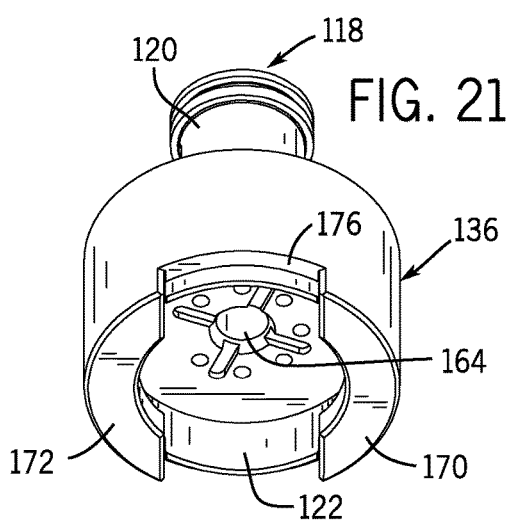
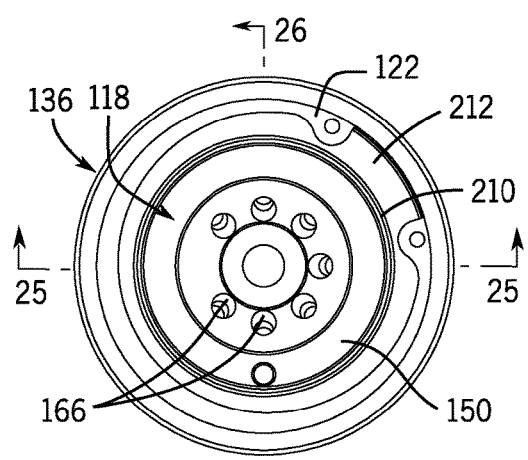
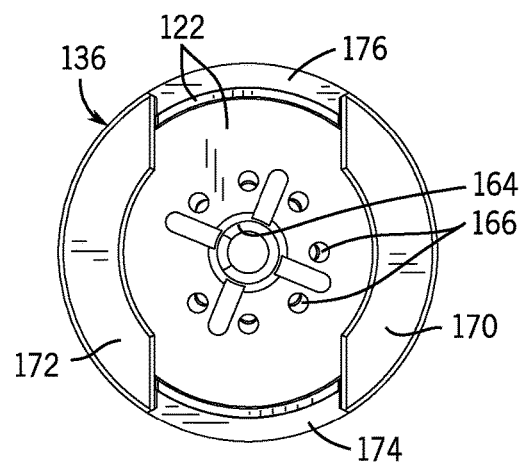
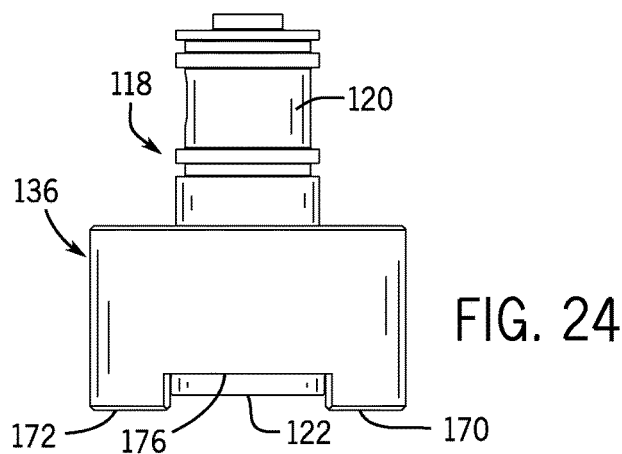

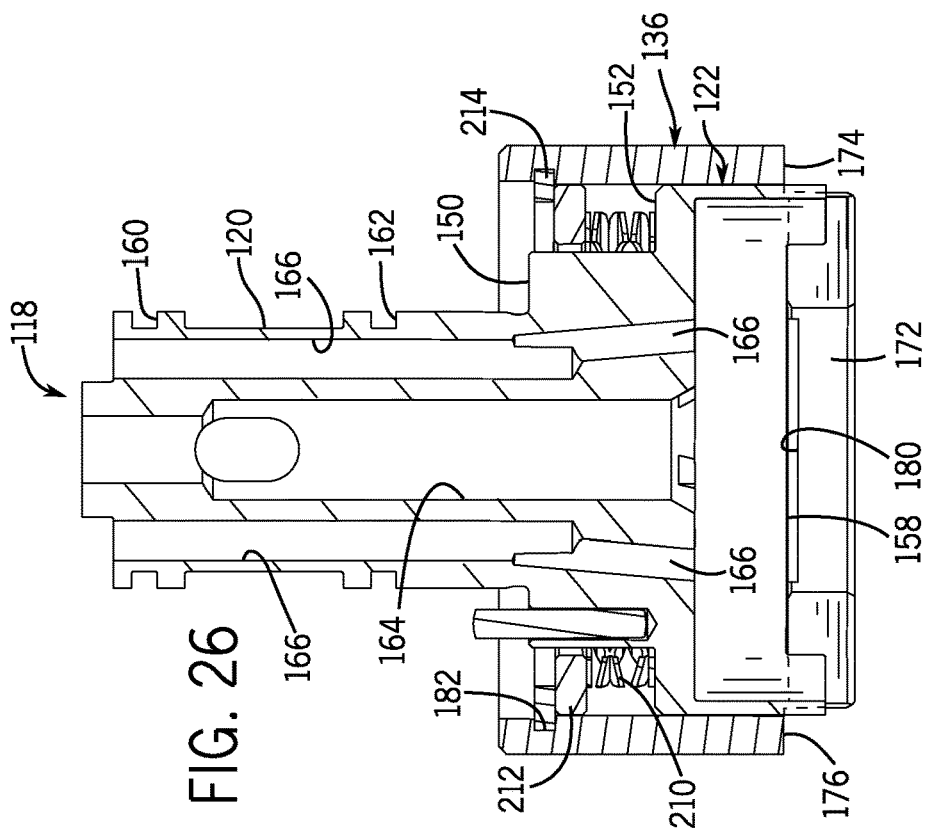
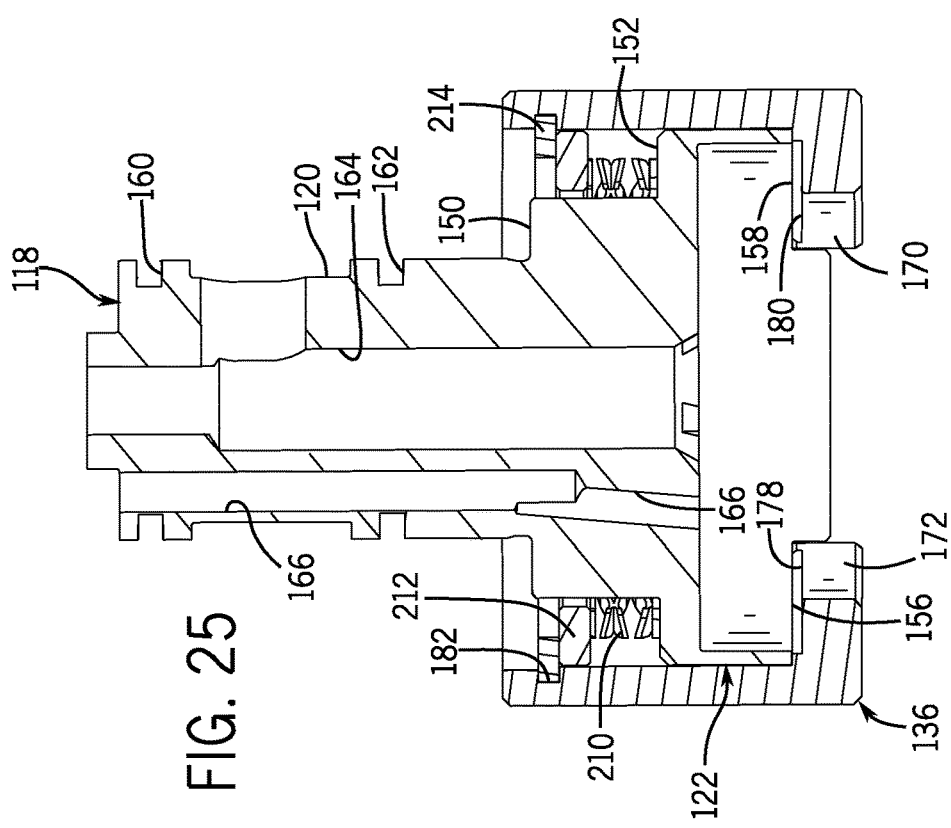

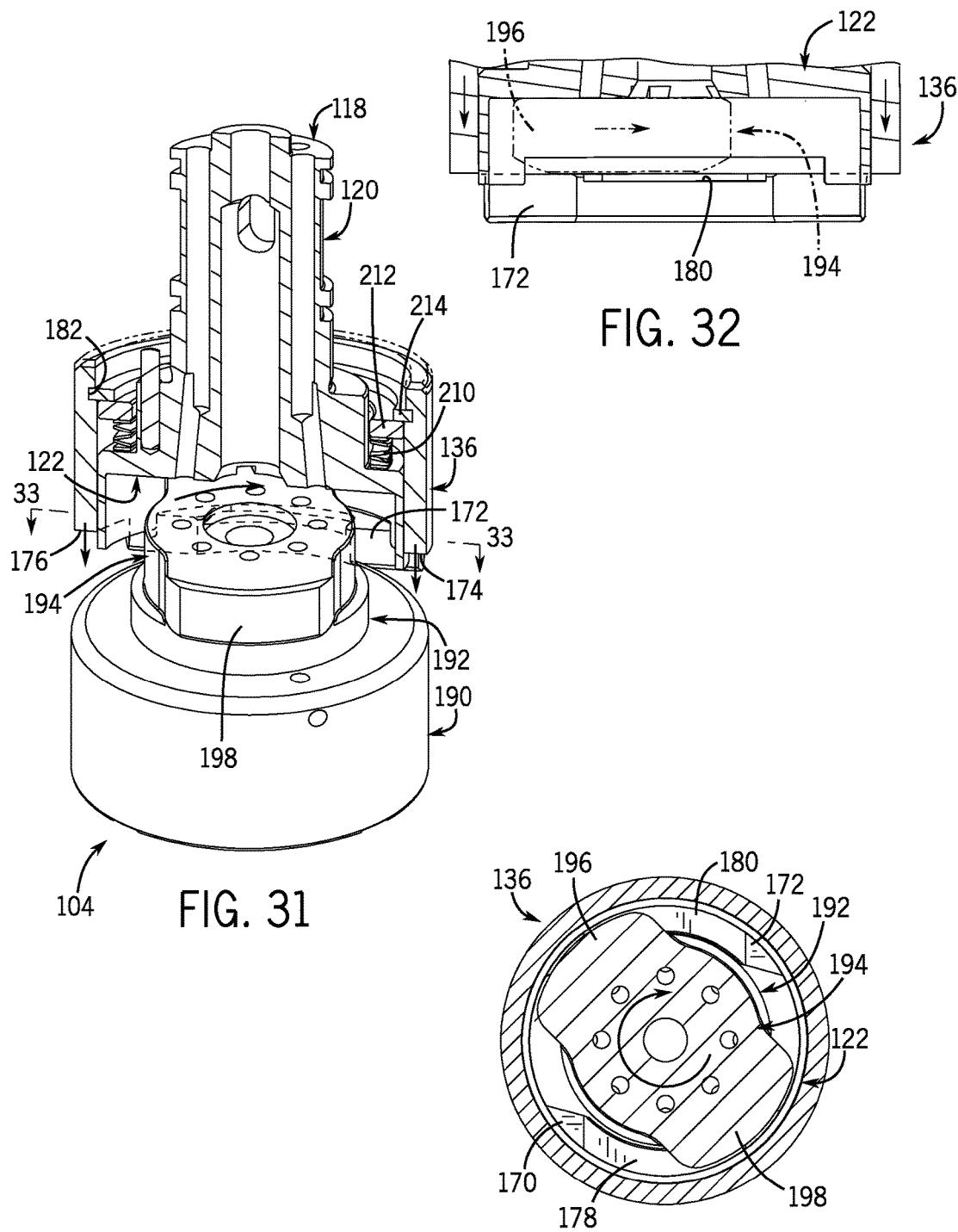

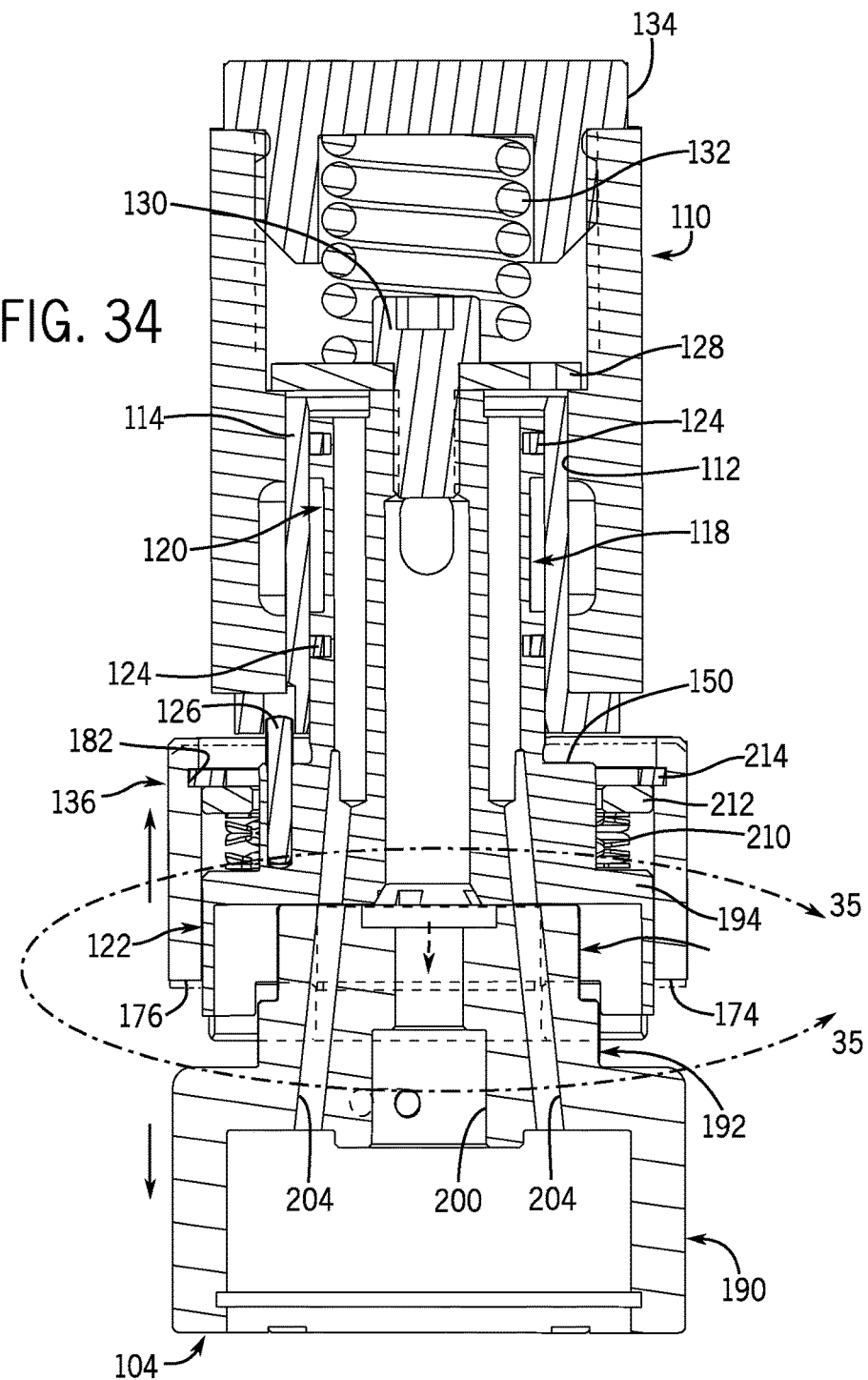

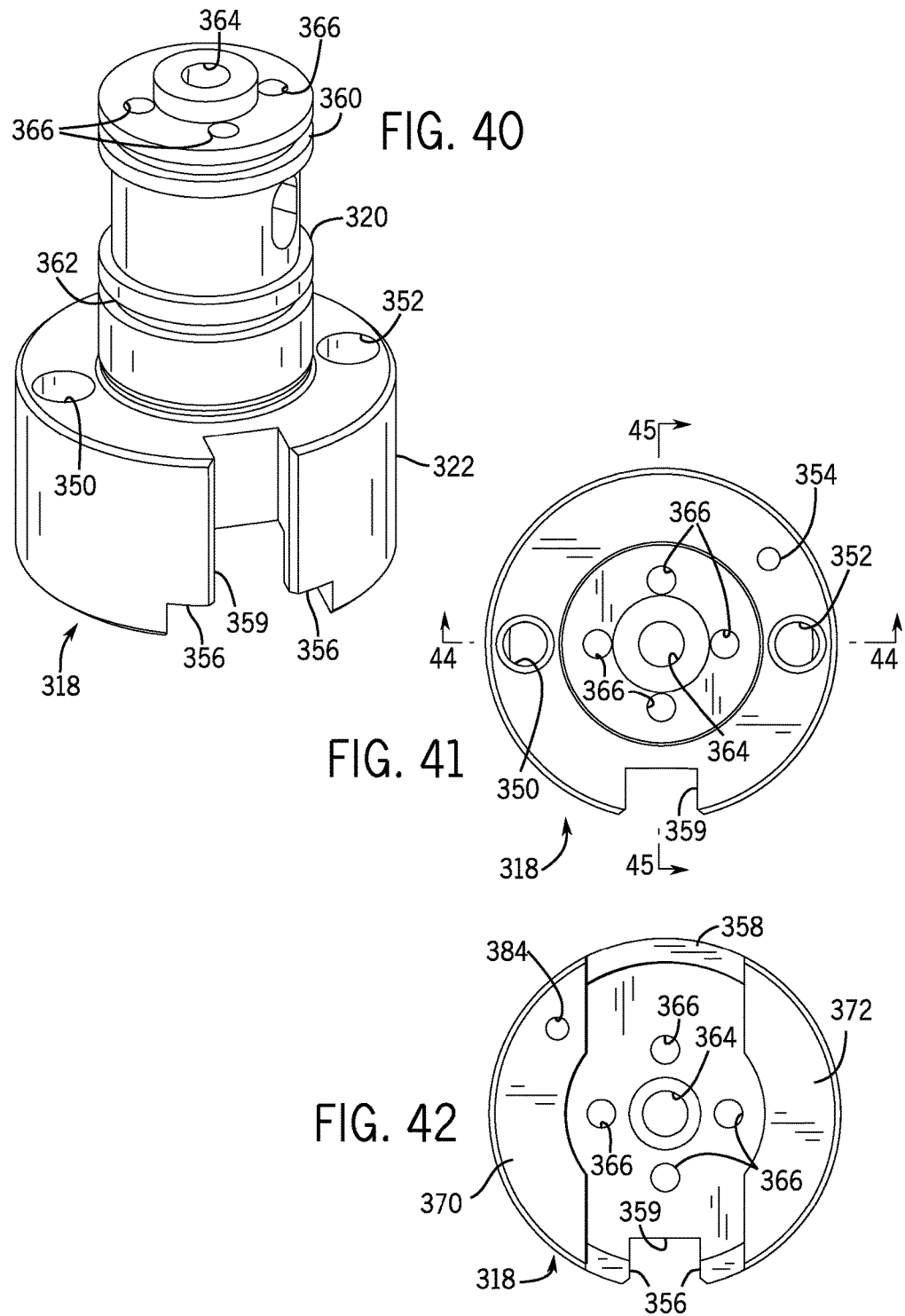

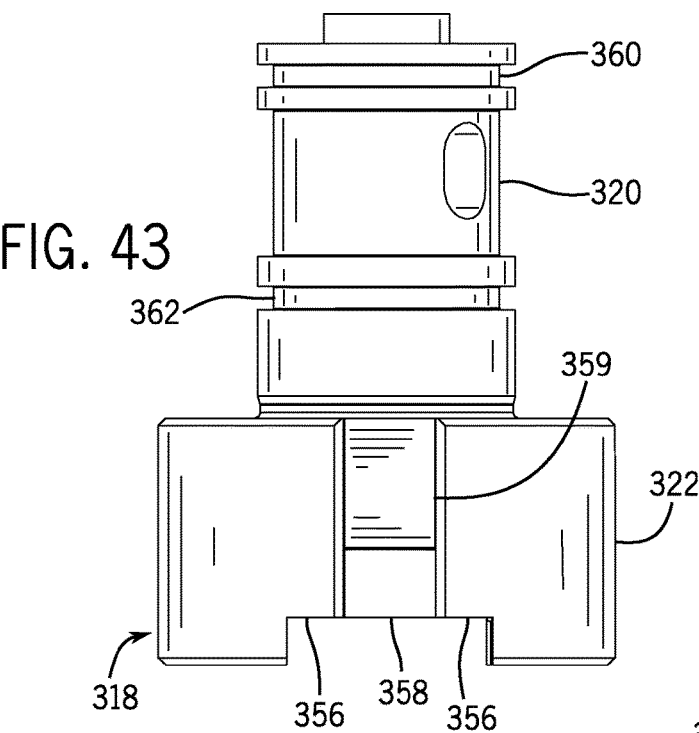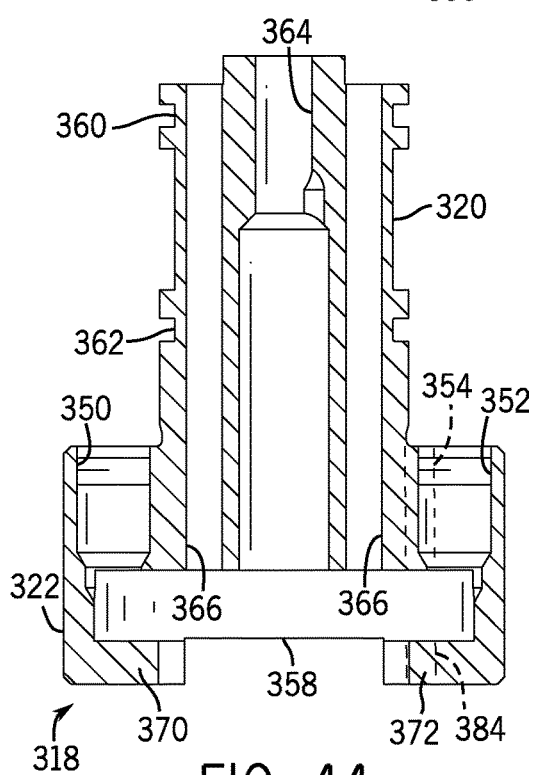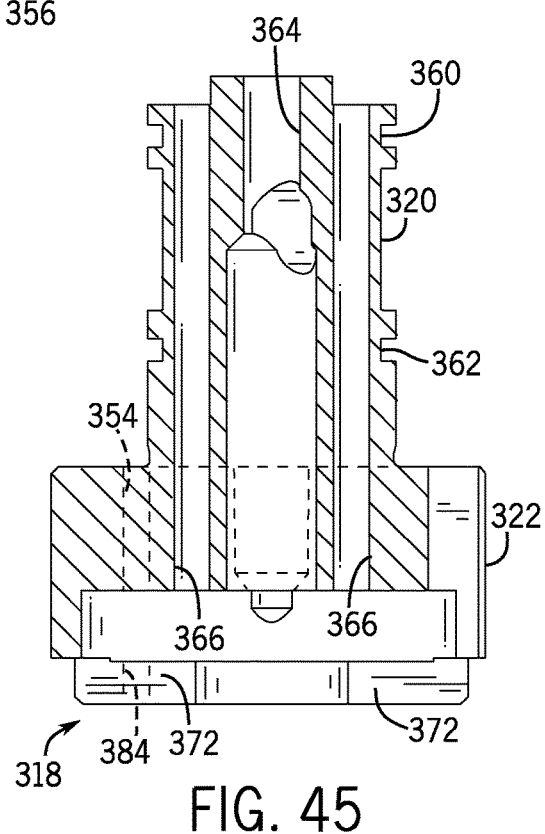

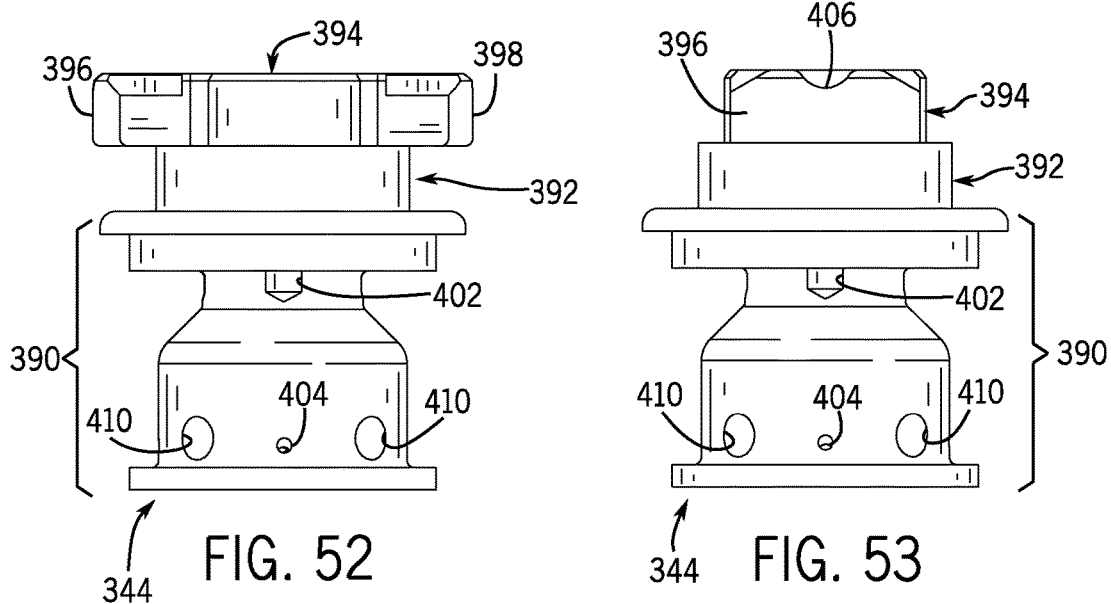
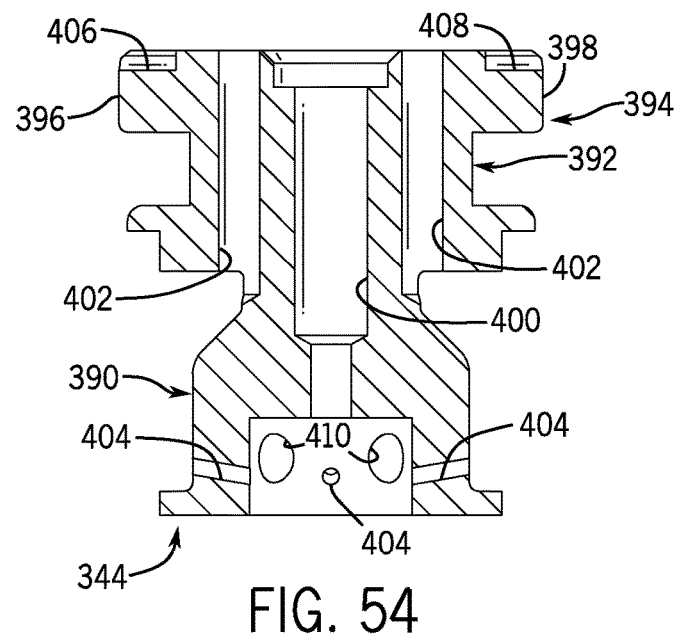

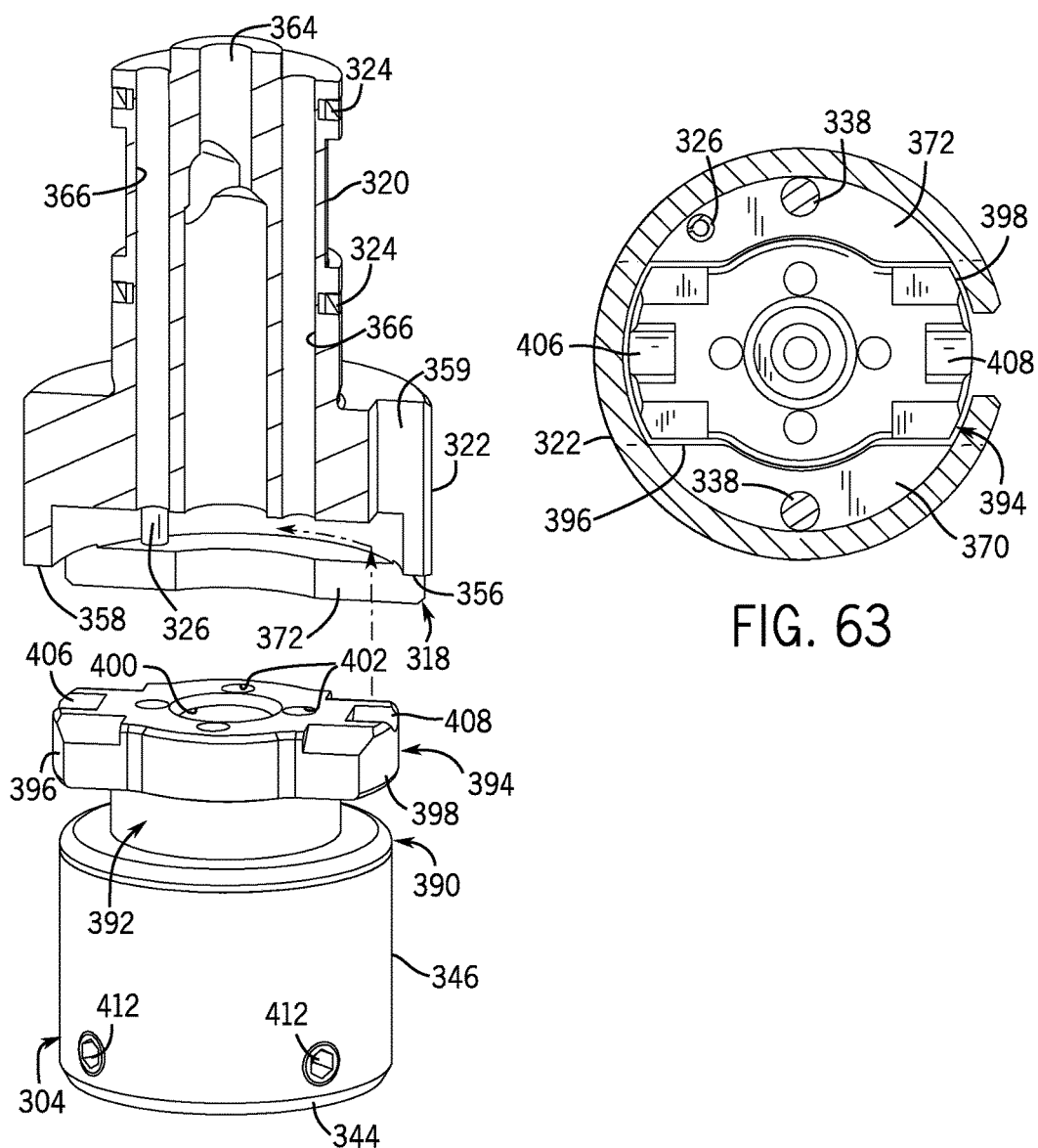

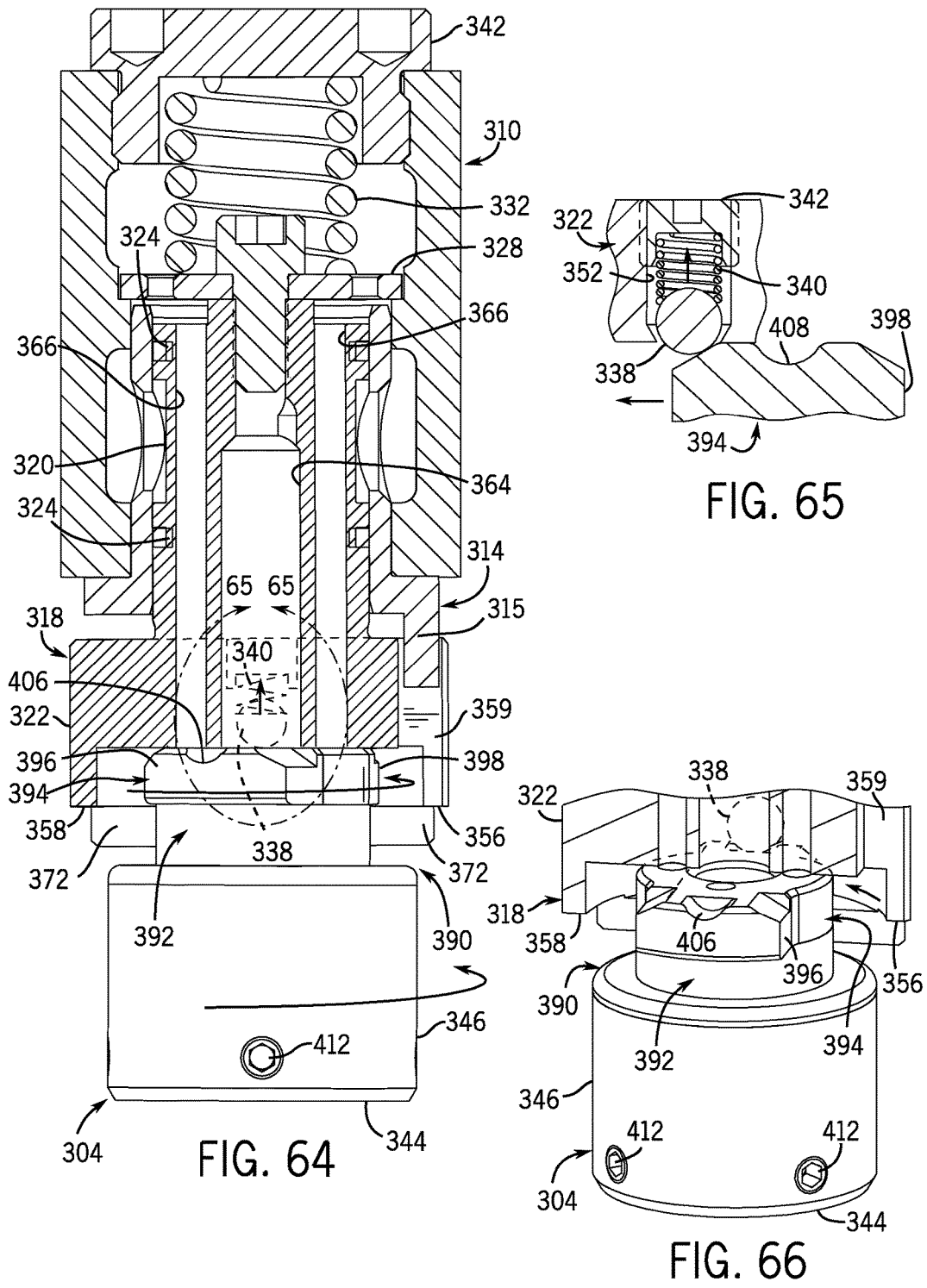

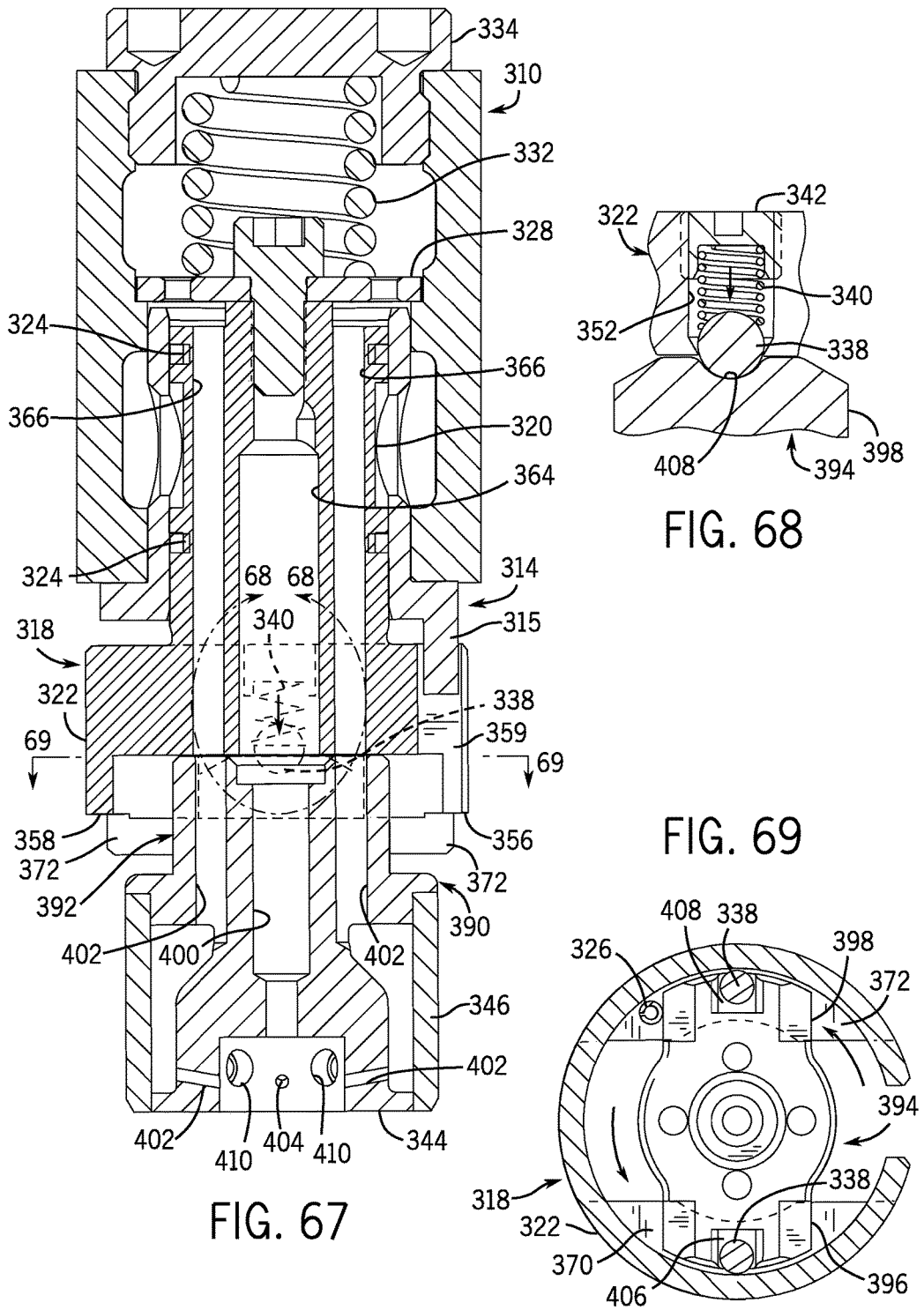

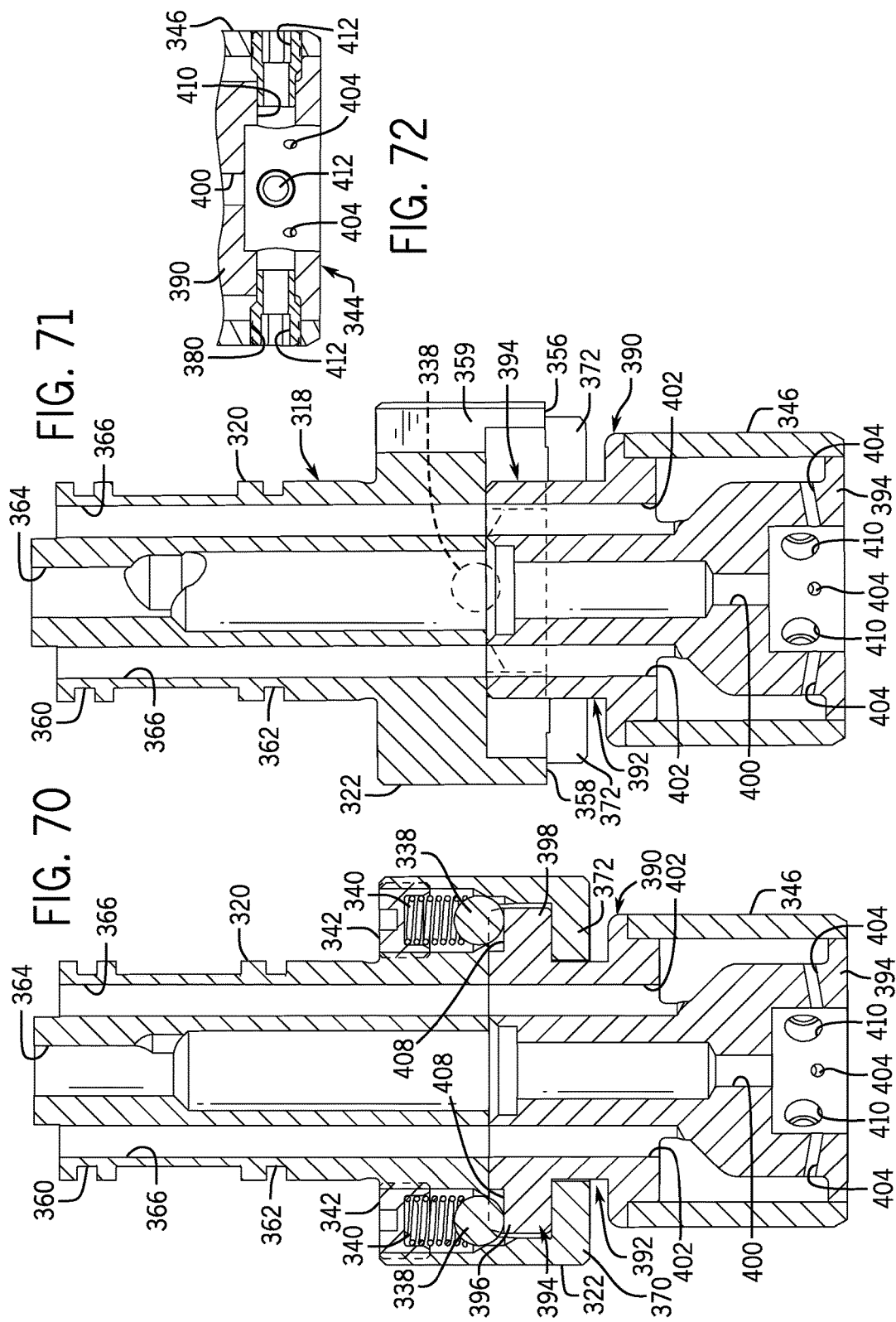

LOCK RING MOUNTING ARRANGEMENT FOR BLOW HEADS

CROSS-REFERENCE TO RELATED APPLICATION

This patent application is a division of U.S. patent application Ser. No. 13/893,427, filed on May 14, 2013, entitled "Lock Ring Mounting Arrangement For Blow Heads," now U.S. Pat. No. 9,701,559 granted on Jul. 11, 2017, which is assigned to the assignee of the present patent application and which is hereby incorporated herein by reference in its entirety.

BACKGROUND OF THE INVENTION

Field of the Invention

The present invention relates generally to mounting blow heads on the blow head arm of an I.S. machine, and more particularly to a blow head mounting arrangement which facilitates the installation and removal of a blow head from a blow head mounting member on the blow head arm by engaging engagement members respectively on the blow head and the blow head mounting arrangement and rotating the blow head with respect to the blow head mounting arrangement.

Molten glass from a furnace is typically formed into glass containers in an efficient, large scale, commercial manufacturing process performed in an Individual Section ("I.S.") machine, which contains between five and twenty identical sections, each of which is capable of making one, two, three, or four containers simultaneously. A stream of molten glass is provided by a furnace from which the stream of molten glass flows. The molten glass stream is cut with a shearing mechanism into uniform segments of glass called "gobs," which fall by gravity and are guided through a gob distribution system of scoops, troughs, and deflectors into blank molds.

In each of the blank molds, a pre-container referred to as a parison is formed, either by using a metal plunger to push the glass into the blank mold, or by blowing the glass from below into the blank mold. The hot parison is then inverted and transferred to a blow mold, where the parison is blown out into the shape of the container in the blow mold, where it is then cooled to the point where it is sufficiently rigid to be gripped and removed from the blow station.

All I.S. machines have from one to four blank molds and an equivalent number of blow molds located inline, with the blank molds being located at one side (the back side) of the section and all of the blow molds being located at the opposite side (the front side) of the section. Multiple sections are located closely adjacent to each other, with the linear array of blank molds and blow molds in each section being located in parallel fashion to the linear arrays of blank molds and blow molds in the other sections.

The operation of each section begins with glass gobs being dropped into the blank molds, a baffle being placed on top of the blank molds, and the glass gobs being blown into parisons, which are upside down. The baffles are removed, the blank mold halves are opened, and all of the parisons in the section are swung with a through a 180 degree arc by a neckring arm to both invert them and move to the locations of the blow molds. The parisons are blown into glass containers in the blow molds with air provided through blow heads respectively located on the finishes of the parisons, and the blown parisons are then cooled by cooling the blow mold and by providing cooling air which flows through a blow tube located in the blow hear into the blown parison to the point where the blown parisons are sufficiently rigid to be gripped and removed from the blow station by a takeout mechanism without sagging or otherwise becoming deformed. They are then removed from the section and placed onto conveyers, which remove them from the I.S. machine.

The focus of the present invention is on the blow heads, which are brought into position on top of the blow molds at the blow stations to engage the parisons' finishes, with the blow heads providing air under pressure (referred to as "final blow" air) through blow tubes extending from the blow heads downwardly into the interior of the parisons at the top ends thereof to blow the parisons into contact with the interior of the blow molds, thereby creating blown parisons with the morphology of the interior of the blow mold. The blow molds are installed on blow head mounting members, which are located at the bottom of sliders which are respectively mounted in blow head arms and are biased downwardly to place pressure on the blow heads as they contact the finishes of the parisons during the final blow process.

Since it is necessary to change blow heads when a different container is to be manufactured, the blow heads are removably from the blow head mounting members. Typically, in order to remove a blow head from a blow head mounting member, it is necessary to use a tool to remove a locking pin which retains the blow head on the blow head mounting member. In order to remove the locking pin and then the blow head, the machine operator must bend into the section with his/her entire upper body. Thus, it may be appreciated that the removal of a blow head and the installation of another blow head is not as simple as might be desired.

Further, blow heads maintained in blow head mounting members with a locking pin tend to vibrate during reciprocating motion of the blow head mechanism, causing wear on the blow heads. Additionally, due to the slackness in the blow heads with respect to the blow head mounting members, the multiple blow heads in a section may not place equal forces on the parison finishes and the blow molds in a section.

It will thus be appreciated that it would be desirable to provide a system and method to facilitate the installation and removal of blow heads onto their respective blow head mounting members. In this regard, it would be desirable that such a system and method not require tools to remove and replace the blow heads, and further that they facilitate the removal and installation of blow heads using only a single hand. It would further be desirable that the system and method also provide a preload to prevent slackness in the blow heads with respect to the blow head mounting members, thereby preventing vibration during oscillation of the blow heads as well as reducing wear on the blow heads.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

The disadvantages and limitations of the background art discussed above are overcome by the present invention.

With this invention, interlocking mechanisms are used to facilitate the installation of blow heads onto a slider assembly and removal of the blow heads from the slider assembly without the use of tools. By orienting the blow head in a first rotational position with respect to a lock ring on the slider assembly and inserting a mounting portion of the blow head into the lock ring and then rotating the blow head 90 degrees to a retained position, the blow head is mounted onto the slider assembly and is ready for operation.

A spring-loaded retaining mechanism resists rotation of the blow head from the retained position, but by pressing the blow head to compress the spring and rotating the blow head 90 degrees the blow head can be placed into a position for removal from the lock ring. The operation can be performed by an operator using only one hand. Multiple embodiments operating in essentially the same manner may be provided, and are illustrated herein by way of example.

In an apparatus embodiment, the lock ring mounting arrangement for a blow head of the present invention comprises: a lock ring member having a hollow interior portion with a pair of opposed engagement flanges located at a bottom of the lock ring member and defining an opening therebetween; wherein the first and second engagement members are respectively arranged and configured to allow the first engagement member of the blow head to be raised and admitted to or lowered and withdrawn from the second engagement member when the blow head is in a first rotational position with respect to the second engagement member; and wherein the first and second engagement members are respectively arranged and configured to allow the first engagement member of the blow head to be locked in the second engagement member when the blow head is rotated from the first rotational position with respect to the second engagement member to a second rotational position with respect to the second engagement member while the first engagement member of the blow head is admitted to the second engagement member; and a spring-loaded retaining mechanism for removably maintaining the blow head in the second rotational position with respect to the second engagement member, wherein the retaining mechanism comprises: a first retaining mechanism located in the blow head mounting element; and a second retaining mechanism located in the lock ring member.

In another apparatus embodiment, the lock ring mounting arrangement for a blow head of the present invention comprises: a blow head having a blow head mounting element connected thereto on top of the blow head, the blow head mounting element having a pair of locking flanges extending from opposite sides thereof; a lock ring member located at a bottom of the blow head arm, the lock ring member having a hollow interior portion and a pair of opposed engagement flanges located at a bottom of the lock ring member which define an opening therebetween; a pair of detent recesses respectively located in the opposed engagement flanges in the lock ring member; wherein the blow head mounting element with its locking flanges and the opening between the engagement flanges of the lock ring member are respectively arranged and configured to allow the blow head mounting element to be raised and admitted to or lowered and withdrawn from the lock ring member when the blow head is in a first rotational position with respect to the lock ring member; and wherein the locking flanges of the blow head mounting element and the engagement flanges of the lock ring member are respectively arranged and configured to allow the blow head mounting element to be locked in the locking ring member when the blow head is rotated from the first rotational position with respect to the second engagement member to a second rotational position with respect to the locking ring member while the locking flanges of the blow head mounting element are admitted to the hollow interior portion of the lock ring member; and a spring-loaded detent mechanism for releasably arresting or resisting rotation of the blow head in the second rotational position with respect to the lock ring member, the detent recesses being configured to engage the locking flanges when the blow head is in the second rotational position with respect to the second engagement member.

In a method embodiment, a method of mounting a blow head onto a blow head arm is disclosed which comprises: providing a first engagement member located on a top of the blow head, wherein the first engagement member comprises a blow head mounting element connected to the blow head by a blow head neck; providing a second engagement member located under the blow head arm wherein the second engagement member comprises a lock ring member having a hollow interior portion with a pair of opposed engagement flanges located at a bottom of the lock ring member and defining an opening therebetween; inserting the first engagement member of the blow head into the second engagement member with the blow head in a first rotational position with respect to the second engagement member; rotating the blow head from the first rotational position with respect to the second engagement member to a second rotational position with respect to the second engagement member while the first engagement member of the blow head is admitted to the second engagement member; removably retaining the blow head in the second rotational position with respect to the second engagement member with a spring-loaded retaining mechanism comprising a first retaining mechanism located in the blow head mounting element and a second retaining mechanism located in the lock ring member; selectively disengaging the retaining mechanism and rotating the blow head from the second rotational position with respect to the second engagement member to the first rotational position with respect to the second engagement member; and withdrawing the first engagement member of the blow head from the second engagement member with the blow head in the first rotational position with respect to the second engagement member to disengage the blow head from the second engagement member.

The lock ring mounting arrangement for blow heads of the present invention provides apparatus and a related method to facilitate the installation and removal of blow heads onto their respective blow head mounting members. In this regard, the lock ring mounting arrangement apparatus and method of the present invention does not require tools to remove and replace the blow heads, and further facilitates the removal and installation of blow heads using only a single hand. Additionally, the lock ring mounting arrangement apparatus and method also provides a preload to prevent slackness in the blow heads with respect to the blow head mounting members, thereby preventing vibration during oscillation of the blow heads as well as reducing wear on the blow heads. Finally, the lock ring mounting arrangement apparatus and method of the present invention achieves numerous advantages without incurring any substantial relative disadvantage.

DESCRIPTION OF THE DRAWINGS

These and other advantages of the present invention are best understood with reference to the drawings, in which:

FIG. 8 is an isometric view of one of the lower lock ring segments illustrated in FIG. 2;

FIG. 9 is a top view of the lower lock ring segment illustrated in FIG. 8;

FIG. 10 is a bottom view of the lower lock ring segment illustrated in FIGS. 8 and 9;

FIG. 11 is a side view of the lower lock ring segment illustrated in FIGS. 8 through 10;

FIG. 12 is a first cross-sectional view of the lower lock ring segment illustrated in FIGS. 8 through 11;

FIG. 13 is a second cross-sectional view of the lower lock ring segment illustrated in FIGS. 8 through 12;

FIGS. 20 through 24 show the assembled upper and lower lock ring segments;

FIGS. 25 and 26 are cross-sectional views 90 degrees apart showing the assembled upper and lower lock ring segments;

FIGS. 30 through 33 show the blow head assembly of FIGS. 27 through 29 being rotated to begin to engage the locking flanges of the blow head assembly in the upper and lower lock ring segments of FIGS. 27 through 29;

FIGS. 34 through 37 show the blow head assembly of FIGS. 27 through 29 in a locked position in the upper and lower lock ring segments of FIGS. 27 through 29;

FIG. 40 is an isometric view of one of the slider assemblies illustrated in FIG. 39 showing a lock ring segment located at the bottom thereof;

FIG. 41 is a top plan view of the slider assembly illustrated in FIG. 40;

FIG. 42 is a bottom plan view of the slider assembly illustrated in FIGS. 40 and 41;

FIG. 43 is a side view of the slider assembly illustrated in FIGS. 40 through 42;

FIGS. 44 and 45 are cross-sectional views 90 degrees apart showing the slider assembly illustrated in FIGS. 40 through 43;

FIGS. 49 through 54 show a blow head structure to which the blow head sleeve illustrated in FIGS. 46 through 48 will be installed;

FIG. 62 is a cross-sectional view showing the movement of the blow head assembly of FIG. 61 to insert it into the lock ring segment of FIG. 61 after which it will be rotated to retain it within the lock ring segment;

FIG. 63 is a cross-sectional view showing the opposed locking flanges of the blow head assembly of FIGS. 61 and 62 as they are initially inserted into the lock ring segment of FIGS. 61 and 62;

FIGS. 64 through 66 show the blow head assembly of FIGS. 61 through 63 being rotated to begin to engage the locking flanges of the blow head assembly in the lock ring segment of FIGS. 61 through 63;

FIGS. 67 through 69 show the blow head assembly of FIGS. 61 through 63 in a locked position in the upper and lower lock ring segments of FIGS. 61 through 63;

FIGS. 70 and 71 are cross-sectional views 90 degrees apart showing the blow head assembly of FIGS. 61 through 63 in a locked position in the upper and lower lock ring segments of FIGS. 61 through 63, and also showing exhaust vent passages located in the lower portion of the blow head assembly; and FIG. 72 is a partial cross-section of the lower portion of the blow head assembly illustrated in FIGS. 70 and 71, showing exhaust vent passages located therein.

DETAILED DESCRIPTION OF EXEMPLARY EMBODIMENTS

Figure 1:
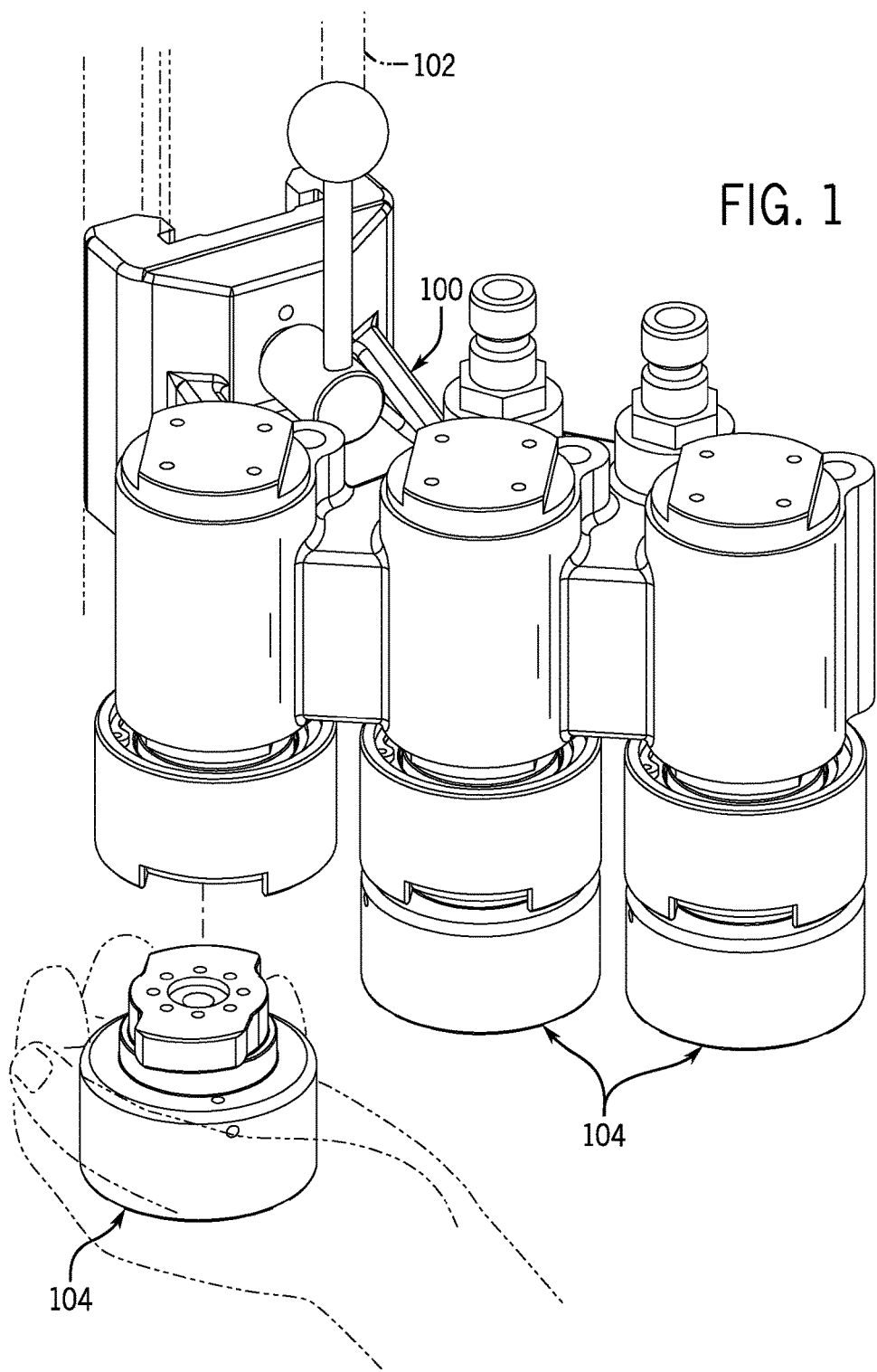
FIG. 1 is an isometric view of a blow head arm having a first embodiment of the lock ring mounting arrangement for blow heads of the present invention, showing two blow head assemblies mounted on their respective blow head mounting members and one blow head assembly about to be installed onto its blow head mounting member.

A first exemplary embodiment of the lock ring mounting arrangement for a blow head of the present invention is illustrated in FIGS. 1 through 38, while a second exemplary embodiment of the lock ring mounting arrangement for a blow head of the present invention is illustrated in FIGS. 39 through 72. Referring first to the first embodiment, and specifically to FIG. 1, a blow head arm assembly 100 is mounted on a vertical post 102 and is raised and lowered with respect to blow molds (not shown in the figures). Extending from the bottom of the blow head arm assembly 100 are three blow head assemblies 104 that in operation will be lowered respectively onto the top of three blow molds.

Figure 2:
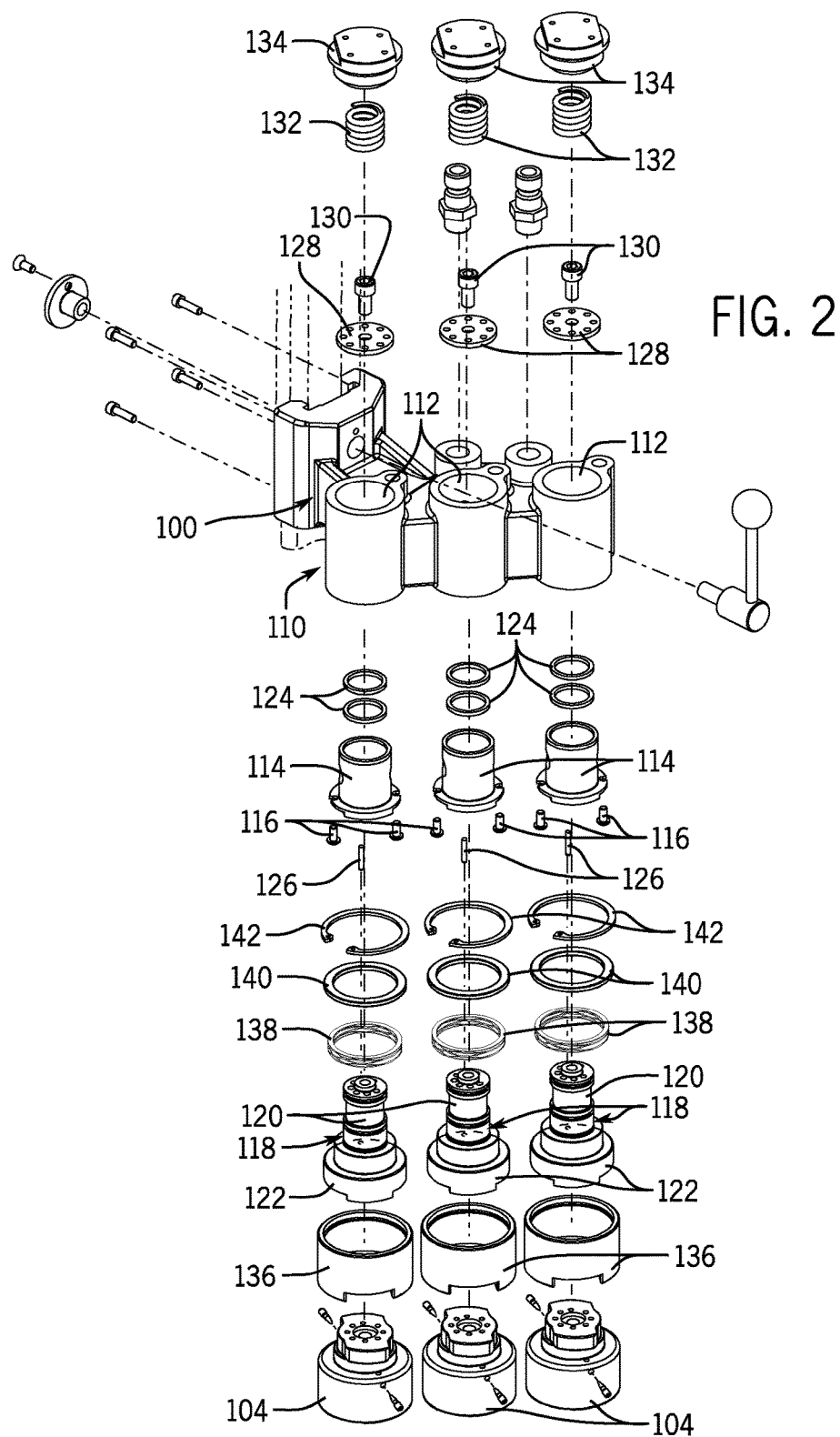
FIG. 2 is an exploded view of the blow head arm illustrated in FIG. 1.
Figure 3:
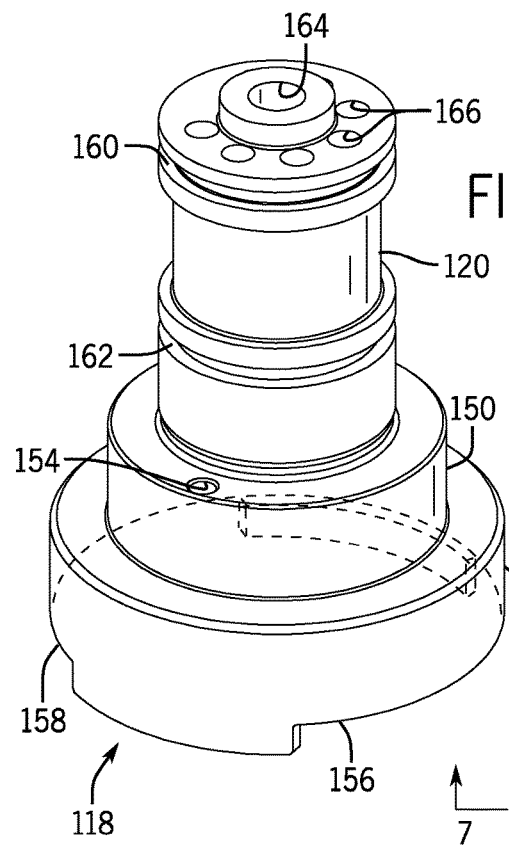
FIG. 3 is an isometric view of one of the slider assemblies illustrated in FIG. 2 showing an upper lock ring segment located at the bottom thereof.
Figure 4:
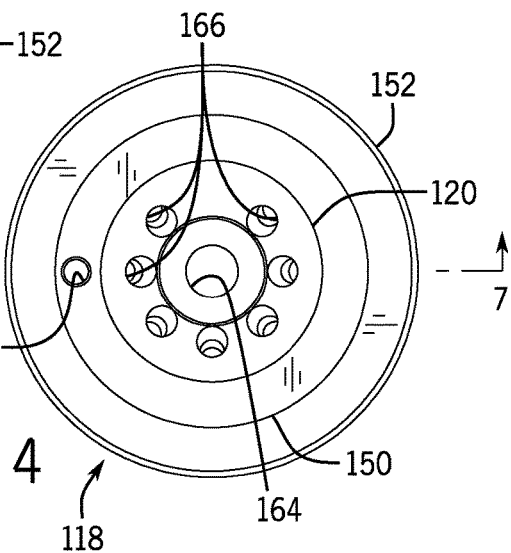
FIG. 4 is a top plan view of the slider assembly illustrated in FIG. 3.

Although the present invention relates to the apparatus and method for installing and removing the blow head assemblies 104 onto the apparatus of the blow head arm assembly 100, as background a brief description of the construction of the blow head arm assembly 100 will be provided in conjunction with FIG. 2. The various components of the blow head arm assembly 100 are assembled onto an upper blow head arm member 110 having three cylindrical interiors 112 (which have various passages located therein which are not pertinent to the present invention). Three cylindrical sleeves 114 (which also have passages not pertinent to the present invention located therein) are respectively mounted into the three cylindrical interiors 112, where they are maintained by bolts 116 that are screwed into the upper blow head arm member 110.

Three slider assemblies 118 each have a cylindrical upper portion 120 which will extend into a respective one of the cylindrical sleeves 114 and an upper lock ring segment 122 located at the bottom of each of the cylindrical upper portions 120. A pair of piston rings 124 are respectively mounted on grooves located on the cylindrical upper portion 120 of the slider assembly 118. A pin 126 extends between each of the slider assemblies 118 and its respective cylindrical sleeve 114 to prevent the slider assemblies 118 from rotating, but allowing them some degree of linear movement with respect to their respective cylindrical sleeves 114.

A washer 128 having multiple apertures about its periphery is mounted onto the top end of each of the cylindrical upper portions 120 of the slider assembly 118 using a bolt 130. The washers 128 are sized to fit into the cylindrical interiors 112, but are stopped from further downward movement by the tops of the cylindrical sleeves 114. A spring 132 is located above each of the washers 128 in each respective cylindrical interior 112, with a retaining cap 134 being screwed into the top of each of the cylindrical interiors 112 to compress the springs 130 to bias the slider assembly 118 downwardly, as limited by the washers 128. This bias will be used by the blow head arm assembly 100 to place downward pressure on the blow head assemblies 104 to maintain them in position on blow molds (not shown herein).

The upper lock ring segments 122 are each inserted into a lower lock ring assembly 136. Located around the cylindrical upper portion 120 of each of the slider assemblies 118 and inserted into the top ends of the lower lock ring assemblies 136 above the upper lock ring segments 122 are (from bottom to top) a spring 138, a ring 140, and a retaining ring 142. The function of each of these components will become apparent below in conjunction with the description of the upper lock ring segment 122 and the lower lock ring assembly 136.

Figure 5:
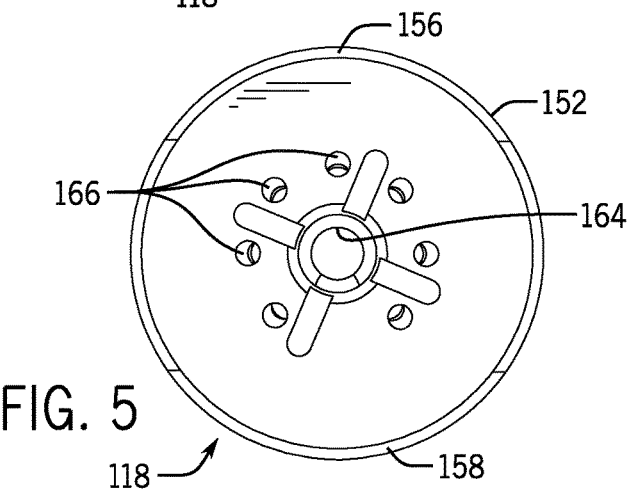
FIG. 5 is a bottom plan view of the slider assembly illustrated in FIGS. 3 and 4.
Figure 6:
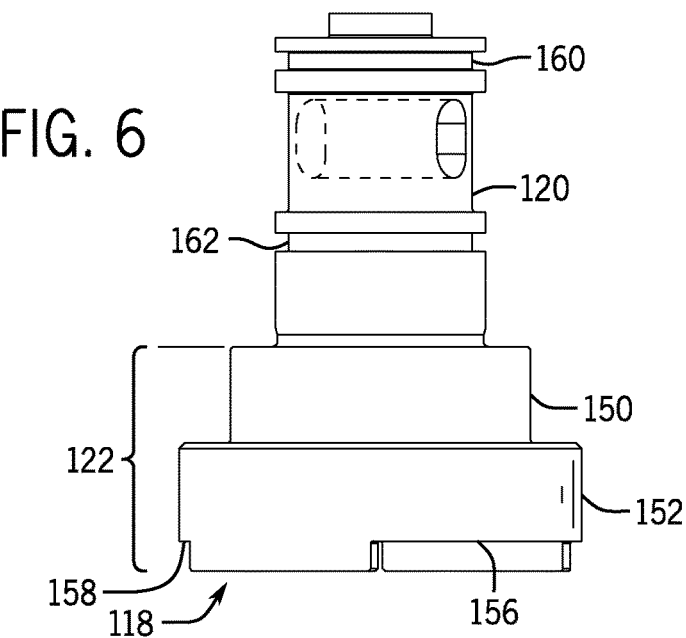
FIG. 6 is a side view of the slider assembly illustrated in FIGS. 3 through 5.
Figure 7:
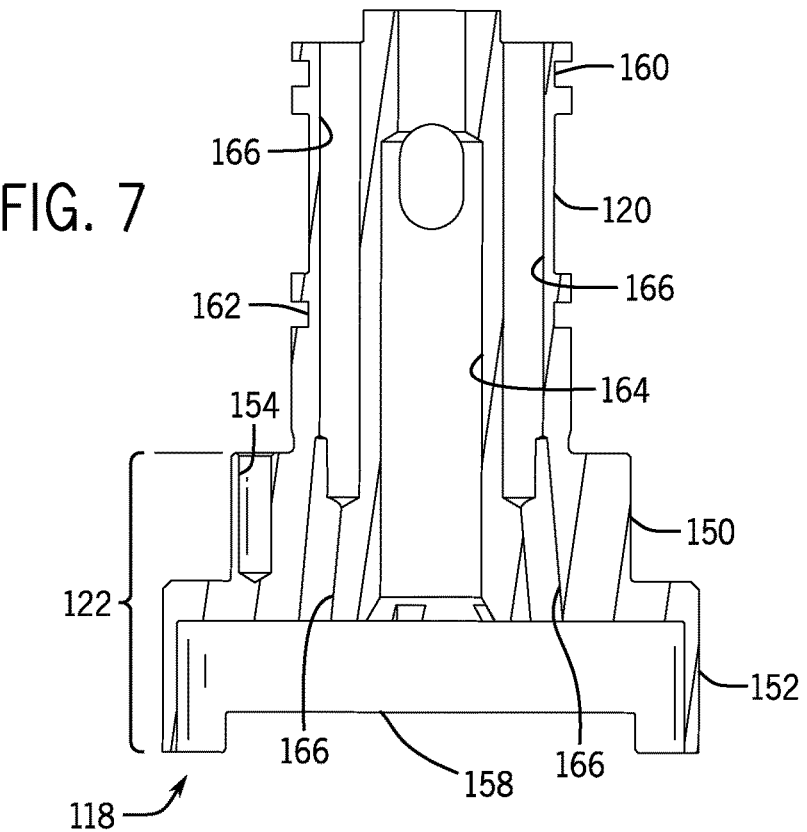
FIG. 7 is a cross-sectional view of the slider assembly illustrated in FIGS. 3 through 6.

Referring now to FIGS. 3 through 7, the construction of the upper lock ring segment 122 of the slider assembly 118 will be described. The upper lock ring segment 122 includes a smaller diameter upper portion 150 and a larger diameter lower portion 152. The smaller diameter portion 150 includes an aperture 154 located therein into which the pin 126 (shown in FIG. 2) will be inserted. The larger diameter lower portion 152 is hollow on the inside thereof as best seen in FIGS. 5 and 7, and its outer wall includes two opposed notches 156 and 158 on the bottom thereof.

The cylindrical upper portion 120 of the slider assembly 118 has two annular grooves 160 and 162 located therein into which the piston rings 124 (shown in FIG. 2) will be located. A central passage 164 extends through the slider assembly 118, from the top of the cylindrical upper portion 120 to the interior of the upper lock ring segment 122, and will be used to supply blow air. Multiple passages 166 extend through the cylindrical upper portion 120 and are arrayed around the central passage 164 into the interior of the upper lock ring segment 122, and will be used to supply cooling air.

Referring now to FIGS. 8 through 13, the construction of the lower lock ring assembly 136 will be described. The lower lock ring assembly 136 is largely a hollow cylinder completely open on the top side thereof to facilitate it being installed onto the larger diameter lower portion 152 of the upper lock ring segment 122 (best shown in FIGS. 3, 6, and 7. Located on the bottom side of the lower lock ring assembly 136 are two opposed inwardly-extending arcuate engagement flanges 170 and 172 which define between them two opposed notches 174 and 176 on the bottom portion of the outer wall of the lower lock ring assembly 136. Located on the top surfaces of the arcuate engagement flanges 170 and 172 at a central location thereof are two detent recesses 178 and 180. Finally, an annular recess 182 is located on the inner surface of the lower lock ring assembly 136 near the top thereof.

Referring next to FIGS. 14 through 19, the construction of the relevant portions of the blow head assembly 104 will be described. The blow head assembly 104 has three segments, which include, from the bottom to the top, a blow head portion 190, a cylindrical blow head neck portion 192, and a blow head mounting portion 194. The blow head portion 190 includes a cylindrical recess 196 that is open at the bottom of the blow head assembly 104 (and that will engage the finish portion of a parison, which is not shown herein). The blow head neck portion 192 is sized to fit between the arcuate engagement flanges 170 and 172 (best shown in FIG. 10).

Figure 17:
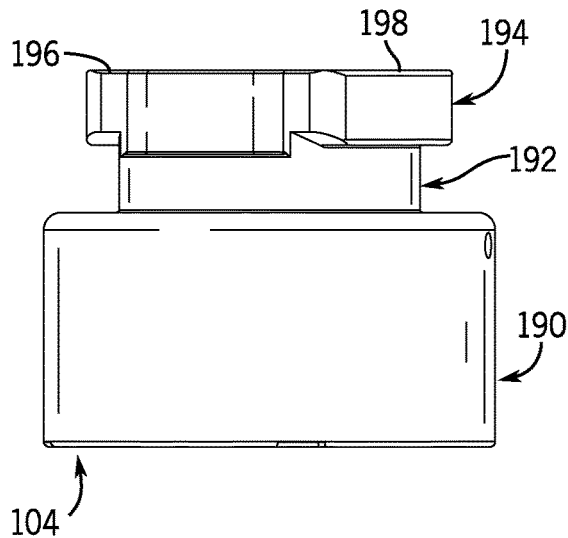
FIG. 17 is a side view of the blow head assembly illustrated in FIGS. 14 through 16.
Figure 18:
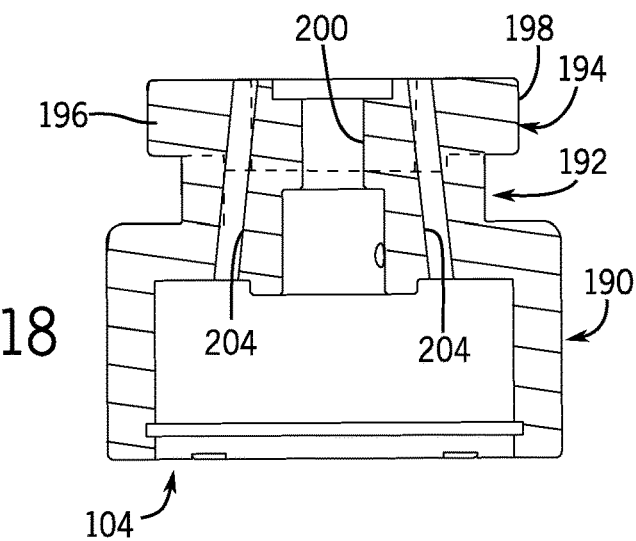
FIG. 18 is a first cross-sectional view of the blow head assembly illustrated in FIGS. 14 through 17.
Figure 19:
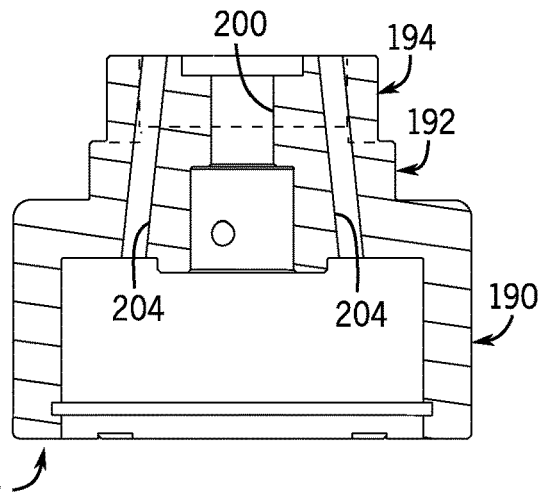
FIG. 19 is a second cross-sectional view of the blow head assembly illustrated in FIGS. 14 through 18.

The blow head mounting portion 194 has opposed locking flanges 196 and 198 extending laterally therefrom on opposite sides thereof. The outer diameters defined by the locking flanges 196 and 198 are sized to fit within the inner diameter of the lower lock ring assembly 136, and the widths of the locking flanges 196 and 198 are defined to fit within the areas defined between the ends of the arcuate engagement flanges 170 and 172. Further, the widths of the locking flanges 196 and 198 are designed to respectively fit within the detent recesses 178 and 180, which locking flanges 196 and 198 and detent recesses 178 and 180 can be collectively thought of as engageable retaining mechanisms. The sides of the locking flanges 196 and 198 are preferably angled on the bottom sides as best shown in FIG. 17.

A central passage 200 extends through the blow head assembly 104, from the top of the blow head mounting portion 194 to the interior of the blow head portion 190, and will be used to supply blow air. Multiple passages 202 extend through the blow head mounting portion 194, the blow head neck portion 192, and the blow head portion 190 and are arrayed around the central passage 200 in the interior of the blow head assembly 104, and will be used to supply cooling air.

Figure 14:
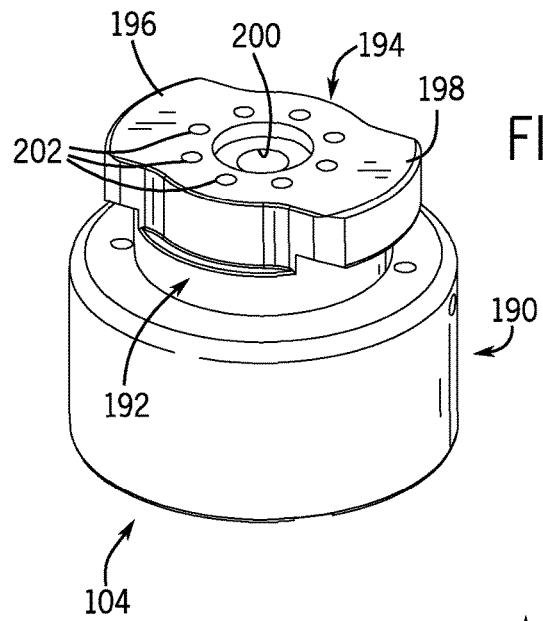
FIG. 14 is an isometric view of one of the blow head assemblies illustrated in FIG. 2, showing opposed locking flanges located at the top end thereof.
Figure 15:
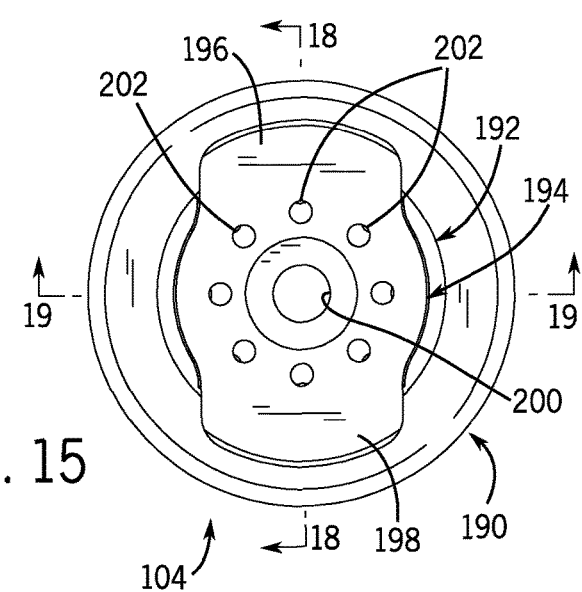
FIG. 15 is a top plan view of the blow head assembly illustrated in FIG. 14.
Figure 16:
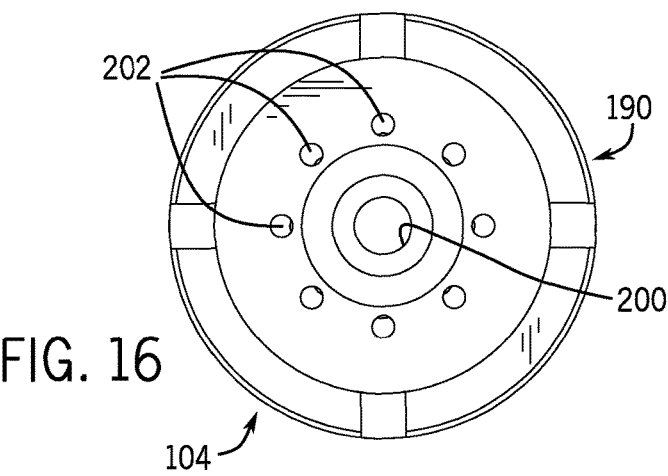
FIG. 16 is a bottom plan view of the blow head assembly illustrated in FIGS. 14 and 15.

Referring now to FIGS. 20 through 26, the assembly of the lower lock ring assembly 136 onto the upper lock ring segment 122 of the slider assembly 118 is shown. While FIGS. 20 through 24 show the external appearance of the completed lock ring assembly, FIGS. 25 and 26 show particular details of the interior of the lock ring assembly, and are helpful to an understanding of the operation of the lock ring assembly. The upper lock ring segment 122 is inserted completely into the interior of the lower lock ring assembly 136. The notches 156 and 158 of the larger diameter lower portion 152 of the upper lock ring segment 122 sit on the top side of the arcuate engagement flanges 170 and 172 of the lower lock ring assembly 136. The upper lock ring segment 122 and the lower lock ring assembly 136 together define a hollow interior portion open only at the bottom thereof intermediate the arcuate engagement flanges 170 and 172, which opening is best shown in FIG. 23. It will be appreciated that this opening is configured to have a contour that will closely admit the blow head mounting portion 194 of the blow head assembly 104 (as best shown in FIGS. 14 and 15).

A spring 210 fits around the smaller diameter portion 150 of the upper lock ring segment 122 and rests on top of the larger diameter lower portion 152 of the upper lock ring segment 122. A flat ring 212 also fits around the smaller diameter portion 150 of the upper lock ring segment 122 and is located on top of the spring 210. A retaining ring 214 also fits around the smaller diameter portion 150 of the upper lock ring segment 122 and is located both on top of the retaining ring 214 and in the annular recess 182 in the lower lock ring assembly 136. It will thus be appreciated that the larger diameter lower portion 152 of the upper lock ring segment 122 is urged downwardly by the spring 210 with respect to the lower lock ring assembly 136. The completed lock ring assembly thus consists of the upper lock ring segment 122, the lower lock ring assembly 136, the spring 210, the ring 212, and the retaining ring 214.

Figure 27:
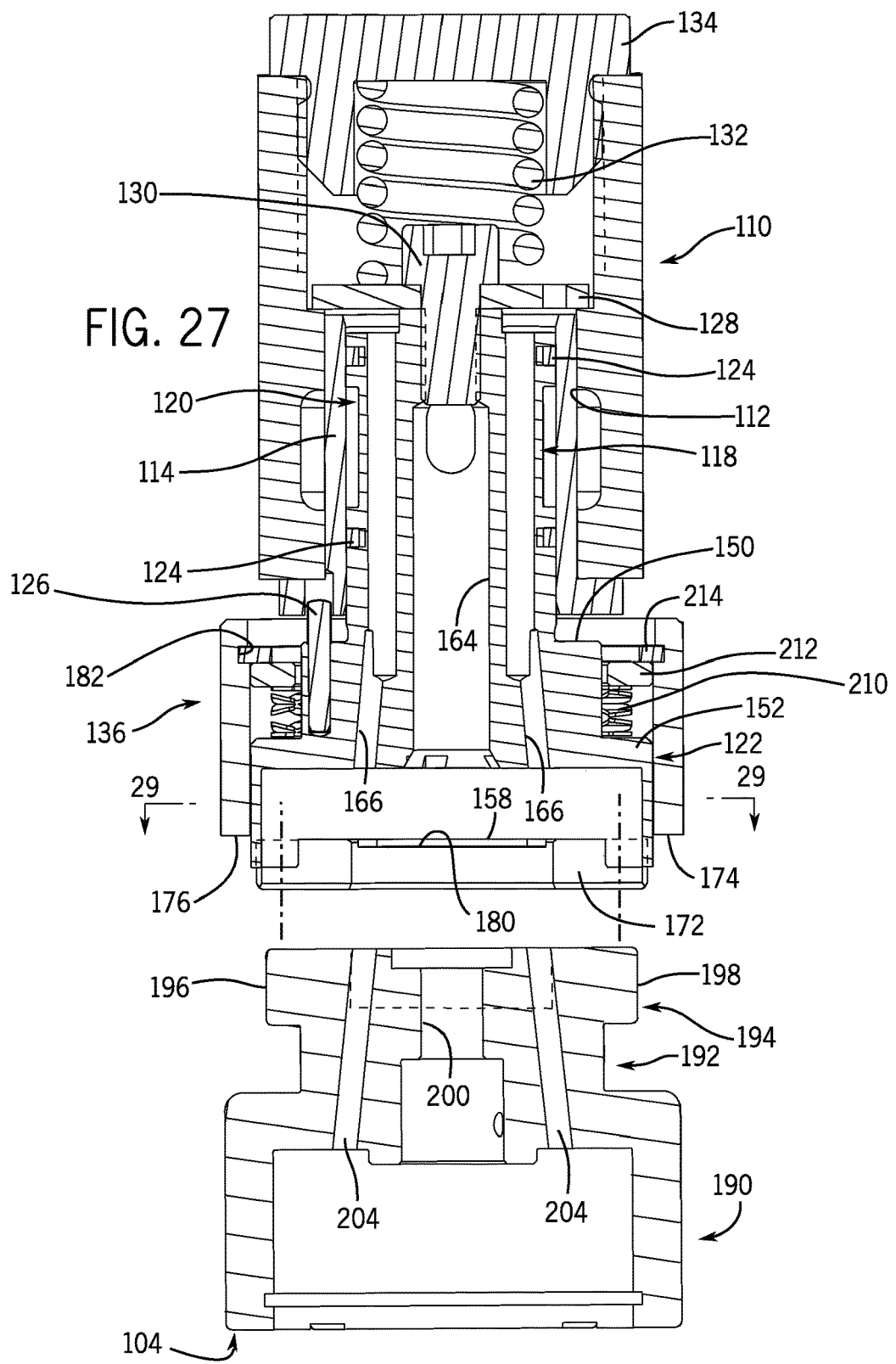
FIG. 27 is a cross-sectional view showing the blow head assembly illustrated in FIGS. 14 through 19 about to be inserted into the upper and lower lock ring segments illustrated in FIGS. 20 through 26, and also showing a number of the components of the blow head arm to which the slider assembly illustrated in FIGS. 3 thorough 7 are installed.
Figure 28:
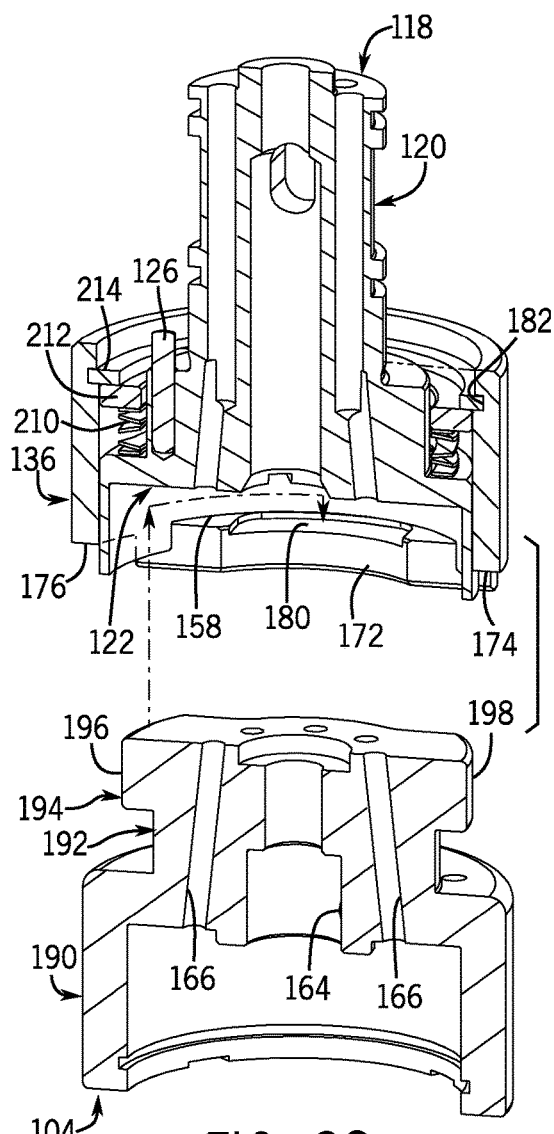
FIG. 28 is a cross-sectional view showing the movement of the blow head assembly of FIG. 27 to insert it into the upper and lower lock ring segments of FIG. 27 after which it will be rotated to retain it within the upper and lower lock ring segments.
Figure 29:
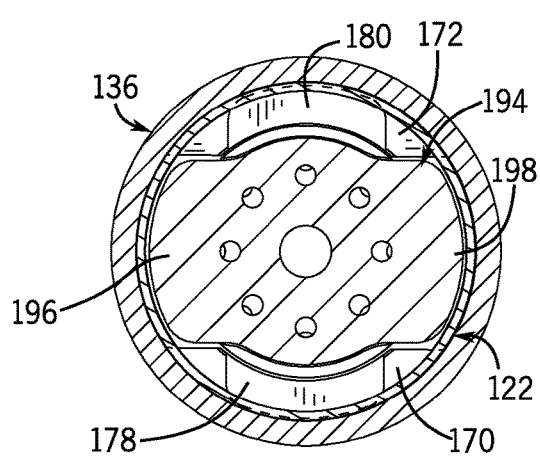
FIG. 29 is a cross-sectional view showing the opposed locking flanges of the blow head assembly of FIGS. 27 and 28 as they are initially inserted into the upper and lower lock ring segments of FIGS. 27 and 28.
Figure 30:
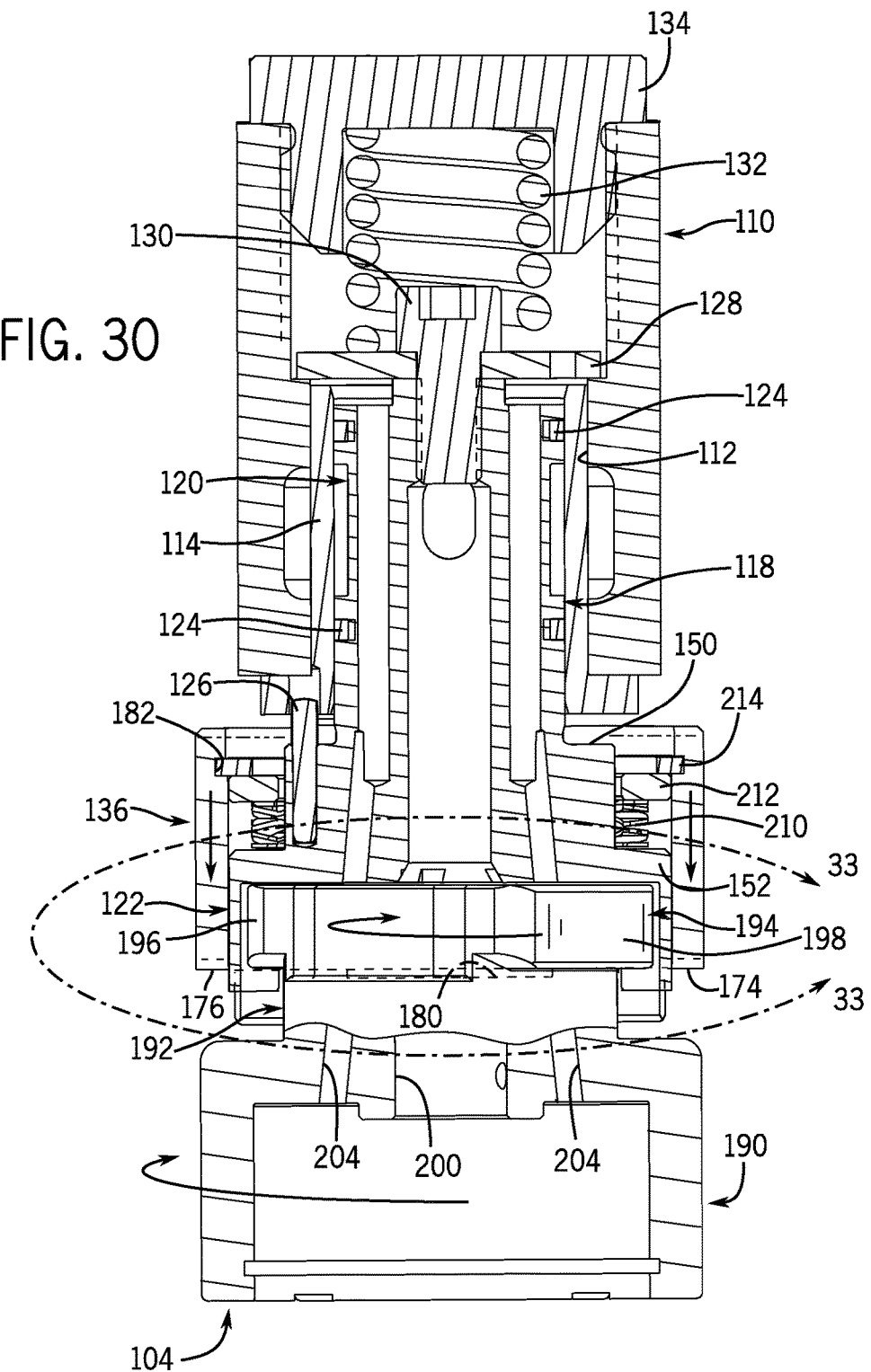
Figures 35, 36, 37:
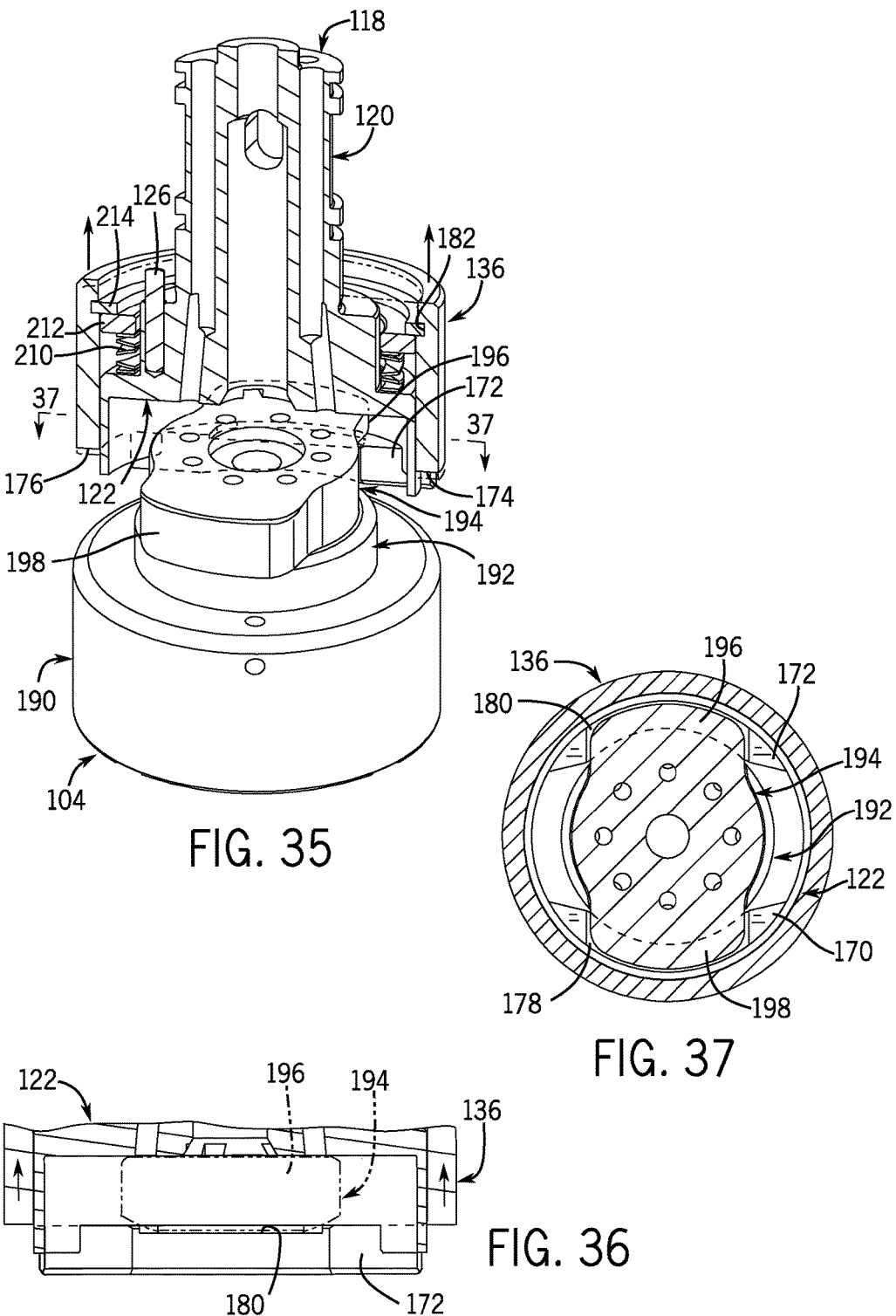
Figure 38:
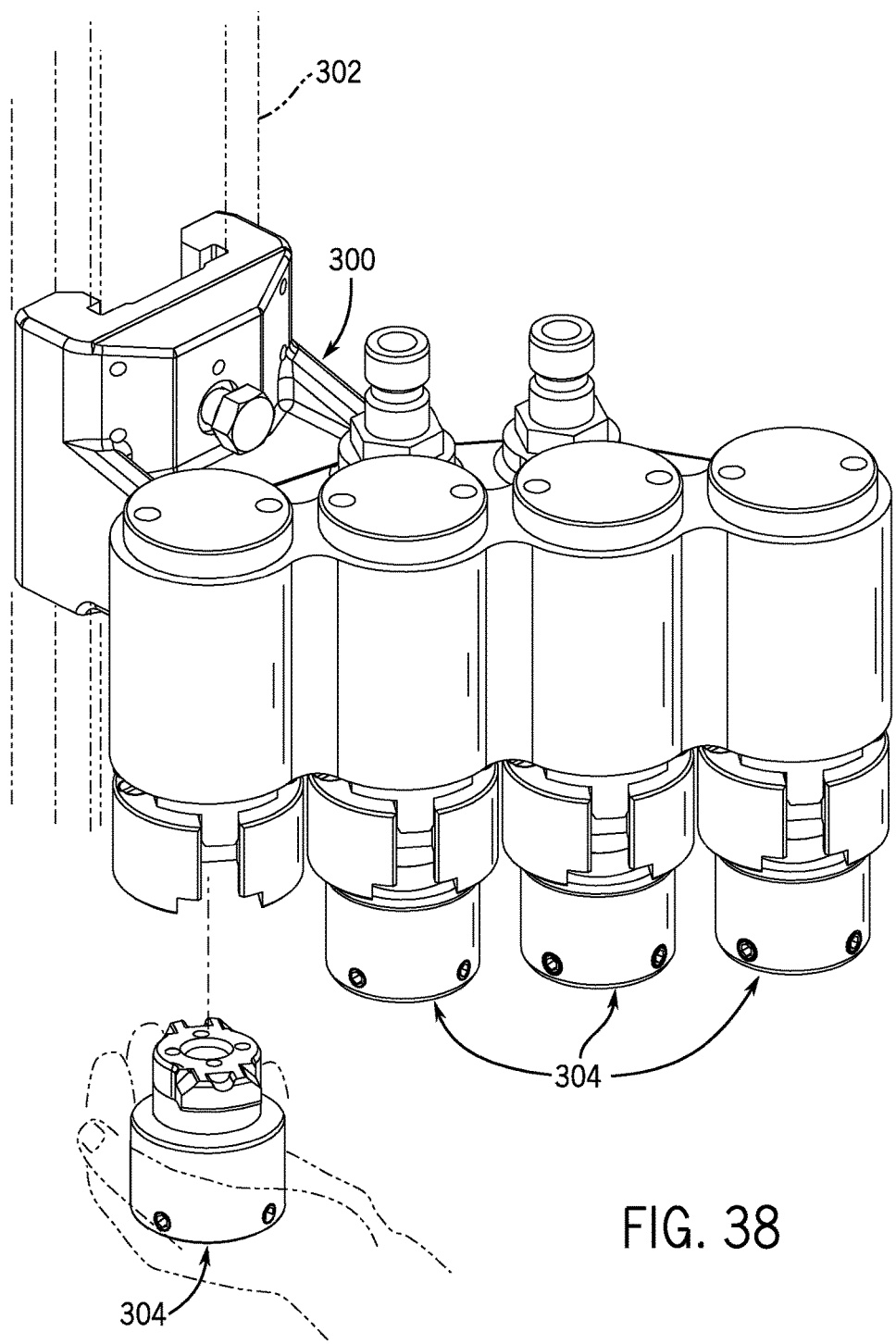
FIG. 38 is an isometric view of a blow head arm having a second embodiment of the lock ring mounting arrangement for blow heads of the present invention, showing three blow heads mounted on their respective blow head mounting members and one blow head about to be installed onto its blow head mounting member.

Referring next to FIGS. 27 through 29, the insertion of the blow head mounting portion 194 of the blow head assembly 104 into the lock ring assembly is shown. The blow head mounting portion 194 including the locking flanges 196 and 198 are inserted through the opening between the arcuate engagement flanges 170 and 172 in the larger diameter lower portion 152 of the upper lock ring segment 122 and into the interior thereof. The opening between the arcuate engagement flanges 170 and 172 are configured to admit the blow head mounting portion 194 therebetween.

Referring now to FIGS. 30 through 33, the rotation of the blow head mounting portion 194 of the blow head assembly 104 within the lock ring assembly from the inserted position that it is in following the process illustrated in FIGS. 27 through 29 is shown. The edges of the arcuate engagement flanges 170 and 172 in the larger diameter lower portion 152 of the upper lock ring segment 122 and/or the locking flanges 196 and 198 of the blow head mounting portion 194 are angled to allow the blow head mounting portion 194 to begin to be rotated in contact with the top surfaces of the locking flanges 196 and 198. This action will draw the lower lock ring assembly 136 downwardly, compressing the spring 210.

Referring next to FIGS. 34 through 37, the installed and locked position of the blow head mounting portion 194 of the blow head assembly 104 on the lock ring assembly is shown. The blow head mounting portion 194 of the blow head assembly 104 continues to be rotated with the locking flanges 196 and 198 of the blow head mounting portion 194 located on top of the arcuate engagement flanges 170 and 172 in the larger diameter lower portion 152 of the upper lock ring segment 122. When the blow head mounting portion 194 of the blow head assembly 104 has been rotated 90 degrees following its insertion into the interior of the lock ring, the locking flanges 196 and 198 of the blow head mounting portion 194 are aligned with the detent recesses 178 and 180, and the force of the spring 210 urge the lower lock ring assembly 136 upwardly, thereby retaining the locking flanges 196 and 198 of the blow head mounting portion 194 in the detent recesses 178 and 180. This will retain the blow head assembly 104 in place on the blow head arm assembly 100.

It will be appreciated that the installation of the blow head assembly 104 on the blow head arm assembly 100 can be performed with one hand of an operator, and that no tools are required to install the blow head assembly 104. Removal of the blow head assembly 104 can be accomplished in similar fashion, since the detent recesses 178 and 180 are also angled to allow the blow head assembly 104 to be rotated, with sufficient force to pull the lower lock ring assembly 136 downwardly against the force exerted by the spring 210.

Figure 39:
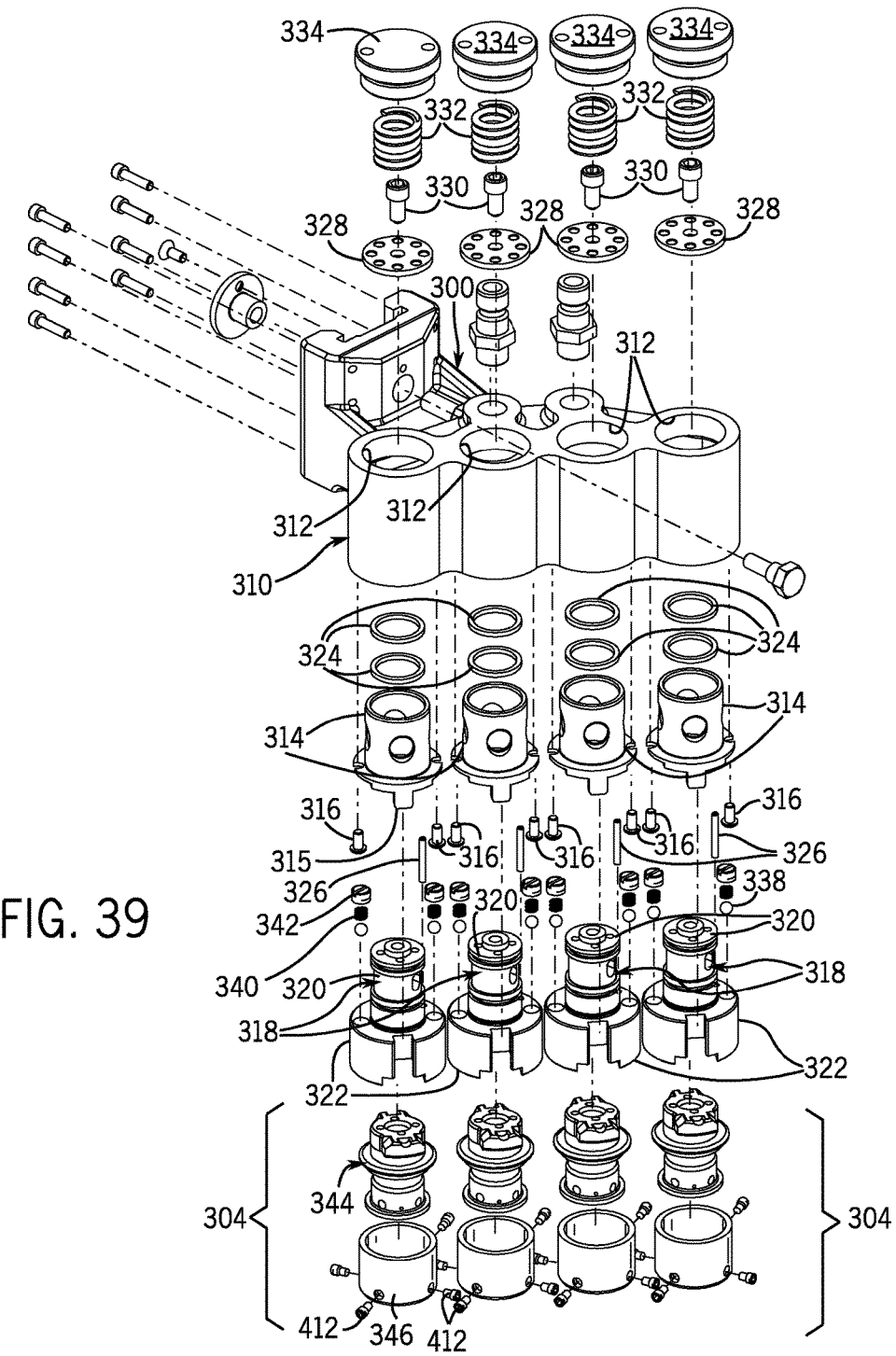
FIG. 39 is an exploded view of the blow head arm illustrated in FIG. 38.

Referring now to the second embodiment of the lock ring mounting arrangement for a blow head of the present invention is illustrated in FIGS. 39 through 72, and specifically to FIG. 39, a blow head arm assembly 300 is mounted on a vertical post 302 and is raised and lowered with respect to blow molds (not shown in the figures). Extending from the bottom of the blow head arm assembly 300 are four blow head assemblies 304 that in operation will be lowered respectively onto the top of three blow molds.

A brief description of the construction of the blow head arm assembly 300 will be provided in conjunction with FIG. 39. The various components of the blow head arm assembly 300 are assembled onto an upper blow head arm member 310 having four cylindrical interiors 312 (which have various passages located therein which are not pertinent to the present invention). Four cylindrical sleeves 314 (which also have passages not pertinent to the present invention located therein) are respectively mounted into the four cylindrical interiors 312, where they are maintained by bolts 316 that are screwed into the upper blow head arm member 310. Each of the cylindrical sleeve 314 has a tab 315 extending downwardly which tabs 315 will be used to prevent the lock rings 322 from rotating, as will become apparent below.

Four slider assemblies 318 each have a cylindrical upper portion 320 which will extend into a respective one of the cylindrical sleeves 314 and a lock ring 322 located at the bottom of each of the cylindrical upper portions 320. A pair of piston rings 324 are respectively mounted on grooves located on the cylindrical upper portion 320 of the slider assembly 318. A roll pin 326 extends between each of the slider assemblies 318 and its respective cylindrical sleeve 314 to prevent the slider assemblies 318 from rotating, but allowing them some degree of linear movement with respect to their respective cylindrical sleeves 314.

A washer 328 having multiple apertures about its periphery is mounted onto the top end of each of the cylindrical upper portions 320 of the slider assembly 318 using a bolt 330. The washers 328 are sized to fit into the cylindrical interiors 312, but are stopped from further downward movement by the tops of the cylindrical sleeves 314. A spring 332 is located above each of the washers 328 in each respective cylindrical interior 312, with a retaining cap 334 being screwed into the top of each of the cylindrical interiors 312 to compress the springs 130 to bias the slider assembly 318 downwardly, as limited by the washers 328. This bias will be used by the blow head arm assembly 300 to place downward pressure on the blow head assemblies 304 to maintain them in position on blow molds (not shown herein).

Two identical locking mechanisms will be inserted into the top of the lock ring 322 on opposite sides thereof. Each of these locking mechanisms includes (from bottom to top) a detent ball 338, a spring 340, and a retaining screw 342. The function of each of these components will become apparent below in conjunction with the full and complete description of the lock ring 322. While not directly relevant to the present invention, it may also be seen that the blow head assembly 104 consists of a main blow head segment 344 and a blow head sleeve 346 that will be installed onto the main blow head segment 344.

Referring now to FIGS. 40 through 45, the construction of the lock ring 322 of the slider assembly 318 will be described. The lock ring 322 is fundamentally cylindrical, with a pair of the detent recesses 350 and 352 located on the top side thereof adjacent opposite sides of the lock ring 322. As may be seen particularly in FIG. 44, the detent recesses 350 and 352 extend into the interior of the lock ring 322. The top surface of the lock ring 322 also includes an aperture 354 located therein into which the roll pin 326 (shown in FIG. 39) will be inserted. The outer wall of the lock ring 322 includes two opposed notches 356 and 358 located on the bottom thereof, with a large vertical slot 359 located in the outer wall of the lock ring 322 above the notch 356. The tab 315 extending from the cylindrical sleeve 314 (both shown in FIG. 39) will extend into the vertical slot 359 to prevent the lock ring 322 from rotating during operation.

The cylindrical upper portion 320 of the slider assembly 318 has two annular grooves 360 and 362 located therein into which the piston rings 324 (shown in FIG. 39) will be located. A central passage 364 extends through the slider assembly 318, from the top of the cylindrical upper portion 320 to the interior of the lock ring 322, and will be used to supply blow air. Multiple passages 366 extend through the cylindrical upper portion 320 and are arrayed around the central passage 364 into the interior of the lock ring 322, and will be used to supply cooling air.

Figure 49:
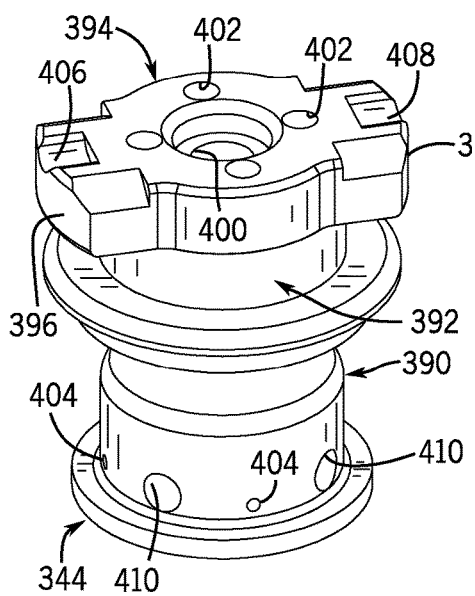
Figure 50:
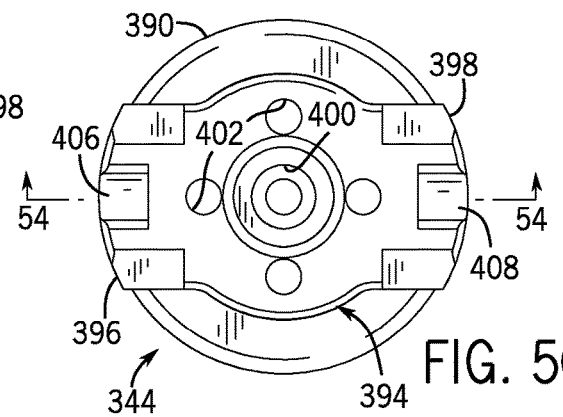
Figure 51:
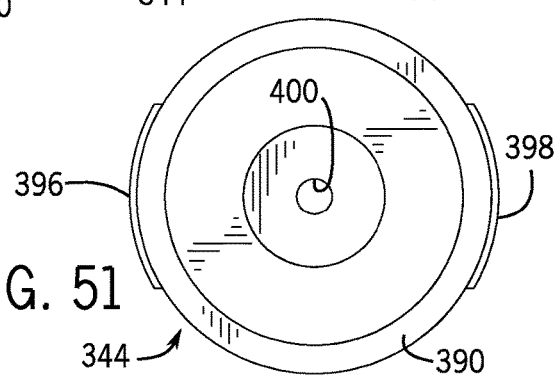
Figure 55:
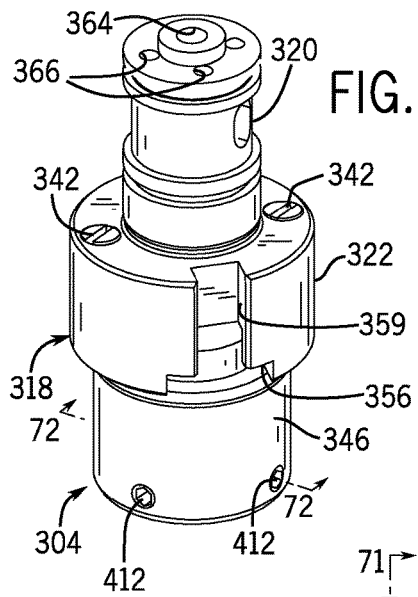
FIGS. 55 through 59 show the blow head sleeve illustrated in FIGS. 46 through 48 installed onto the blow head structure shown in FIG. 50 through to form the blow head assembly, which is shown installed in the lock ring segment of the slider assembly illustrated in FIGS. 40 through 45.
Figure 56:
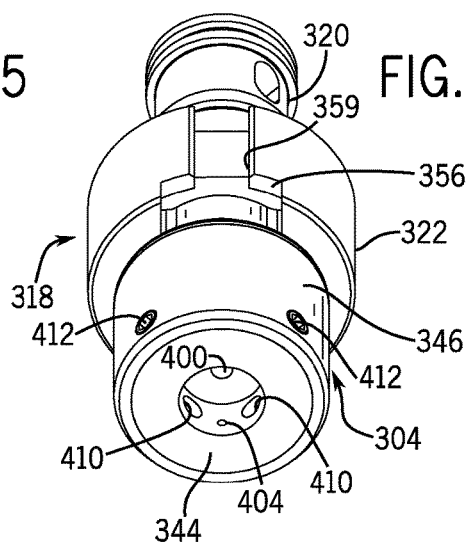
Figure 57:
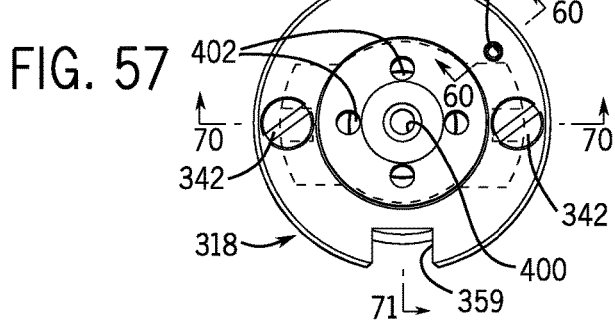
Figure 58:
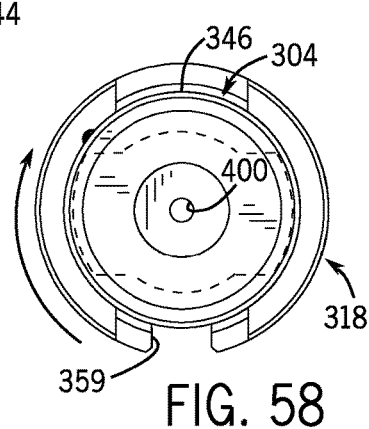
Figure 59:
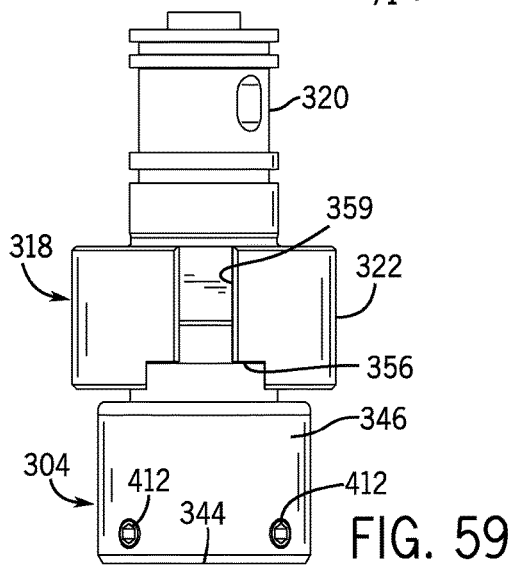

The lock ring 322 has a hollow interior as best shown in FIGS. 44 and 45, and is also partially open on the bottom thereof. It will be appreciated that this opening is configured to have a contour that will closely admit the blow head mounting portion 394 of the main blow head segment 344 (as best shown in FIGS. 49 and 50 the details of which are described below). Located on the bottom side of the lock ring 322 are two opposed inwardly-extending arcuate engagement flanges 370 and 372 which have the two opposed notches 356 and 358 extending therebetween on the bottom portion of the outer wall of the lock ring 322. An aperture 384 is located in the arcuate engagement flange 372 and is axially aligned with the aperture 354 in the top of the lock ring 322. Finally, referring to FIG. 44, it may be seen that the detent recesses 350 and 352 are open at the bottoms thereof into the hollow interior of the lock ring 322 respectively above the arcuate engagement flanges 370 and 372.

Figure 46:
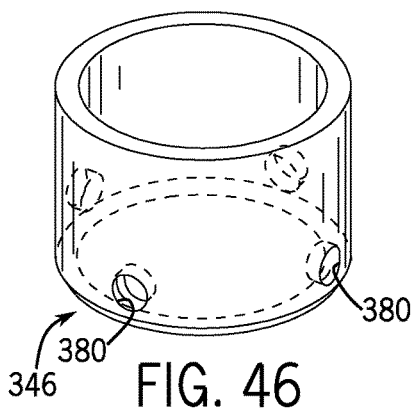
FIGS. 46 through 48 show a blow head sleeve that forms part of a blow head assembly.
Figure 47:
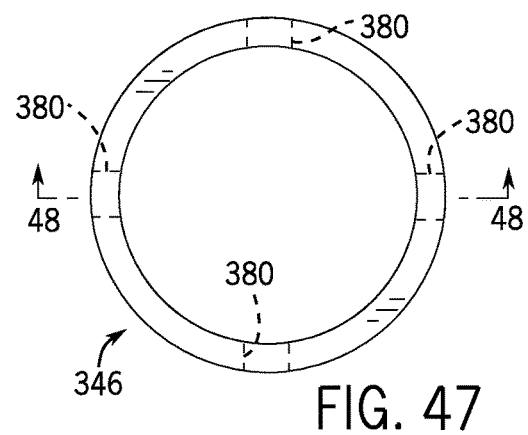
Figure 48:
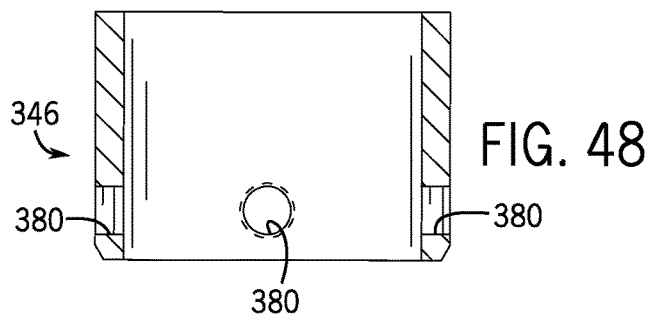

Referring next to FIGS. 46 through 48, the blow head sleeve 346 is shown to be of hollow cylindrical construction. It has four angularly equally spaced apertures 380 located therein near the bottom end thereof. The blow head sleeve 346 is sized appropriately to fit on the bottom portion of the main blow head segment 344.

Referring now to FIGS. 49 through 54, the construction of the relevant portions of the main blow head segment 344 will be described. The main blow head segment 344 has three segments, which include, from the bottom to the top, a blow head portion 390, a cylindrical blow head neck portion 392, and a blow head mounting portion 394. The blow head portion 390 includes a cylindrical recess 396 that is open at the bottom of the main blow head segment 344 as shown in FIG. 45 (and that will engage the finish portion of a parison, which is not shown herein). The blow head neck portion 392 is sized to fit between the arcuate engagement flanges 370 and 372 (best shown in FIG. 42).

The blow head mounting portion 394 has opposed locking flanges 396 and 398 extending laterally therefrom on opposite sides thereof. The outer diameters defined by the locking flanges 396 and 398 are sized to fit within the inner diameter of the interior of the lock ring 322, and the widths of the flanges 396 and 398 are defined to fit within the areas defined between the ends of the arcuate engagement flanges 370 and 372. The sides of the locking flanges 396 and 398 are angled on the top sides as best shown in FIGS. 49 and 50.

A central passage 400 extends through the main blow head segment 344, from the top of the blow head mounting portion 394 to the interior of the blow head portion 390, and will be used to supply blow air. Multiple passages 402 extend through the blow head mounting portion 394, the blow head neck portion 392, and exit at the outside of the blow head portion 390 and are arrayed around the central passage 400 in the interior of the main blow head segment 344, and will be used to supply cooling air. Multiple passages 404 extend through the blow head portion 390 from the outside to the inside thereof. It will be appreciated that when the blow head sleeve 346 (shown in FIGS. 46 through 48) is mounted onto the blow head portion 390, 402 and the passages 404 will supply blow air from the top of the blow head mounting portion 394 to the interior of the blow head portion 390.

Respectively centrally located on the top sides of the locking flanges 396 and 398 at the distal ends thereof are detent recesses 404 and 406. Located about the circumference of the blow head portion 390 are four apertures 410 that will be aligned with the four apertures 380 in the blow head sleeve 346 when the blow head sleeve 346 is mounted on the main blow head segment 344. Four venting screws 412 (best shown in FIGS. 39 and 72) are screwed through the apertures 380 in the blow head sleeve 346 and into the apertures 410 in 390 of the main blow head segment 344, and function both to retain the blow head sleeve 346 on the main blow head segment 344 as well as to allow cooling air to be vented out of the blow head 304.

Referring next to FIGS. 55 through 59, the slider assembly 318 is shown with the detent ball apparatus installed and with the retaining screws 342 being visible (the detent ball 338 and the spring 340 shown in FIG. 39 are not visible in these figures). Additionally, the blow head sleeve 346 illustrated in FIGS. 46 through 48 is shown installed onto the main blow head segment 344 shown in FIGS. 50 through 54, with the venting screws 412 being clearly visible. Further, the blow head 304 (which includes the main blow head segment 344 and the blow head sleeve 346) is installed into the lock ring 322 of the slider assembly 318.

Figure 60:
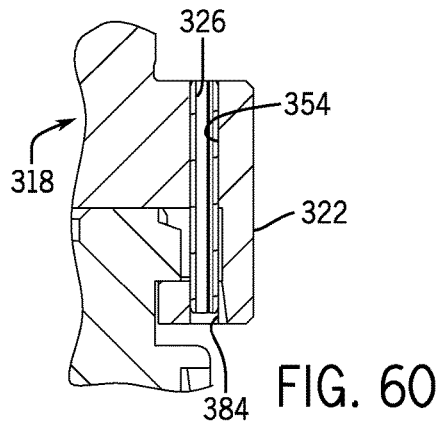
FIG. 60 is a partial cross-sectional view of a portion of the assembly illustrated in FIGS. 40 through 45 and especially in FIGS. 57 and 58, showing a roll pin used to prevent the blow head assembly from further rotation once it has been rotated to engage it in the lock ring segment of the slider assembly.

Referring now to FIG. 60, the roll pin 326 is shown installed in the apertures 354 and 384 of the slider assembly 318. The function of the roll pin 326 is to limit the rotation of the locking flange 396 of the blow head 304 to 90 degrees once it has been inserted into the lock ring 322 of the slider assembly 318.

Figure 61:
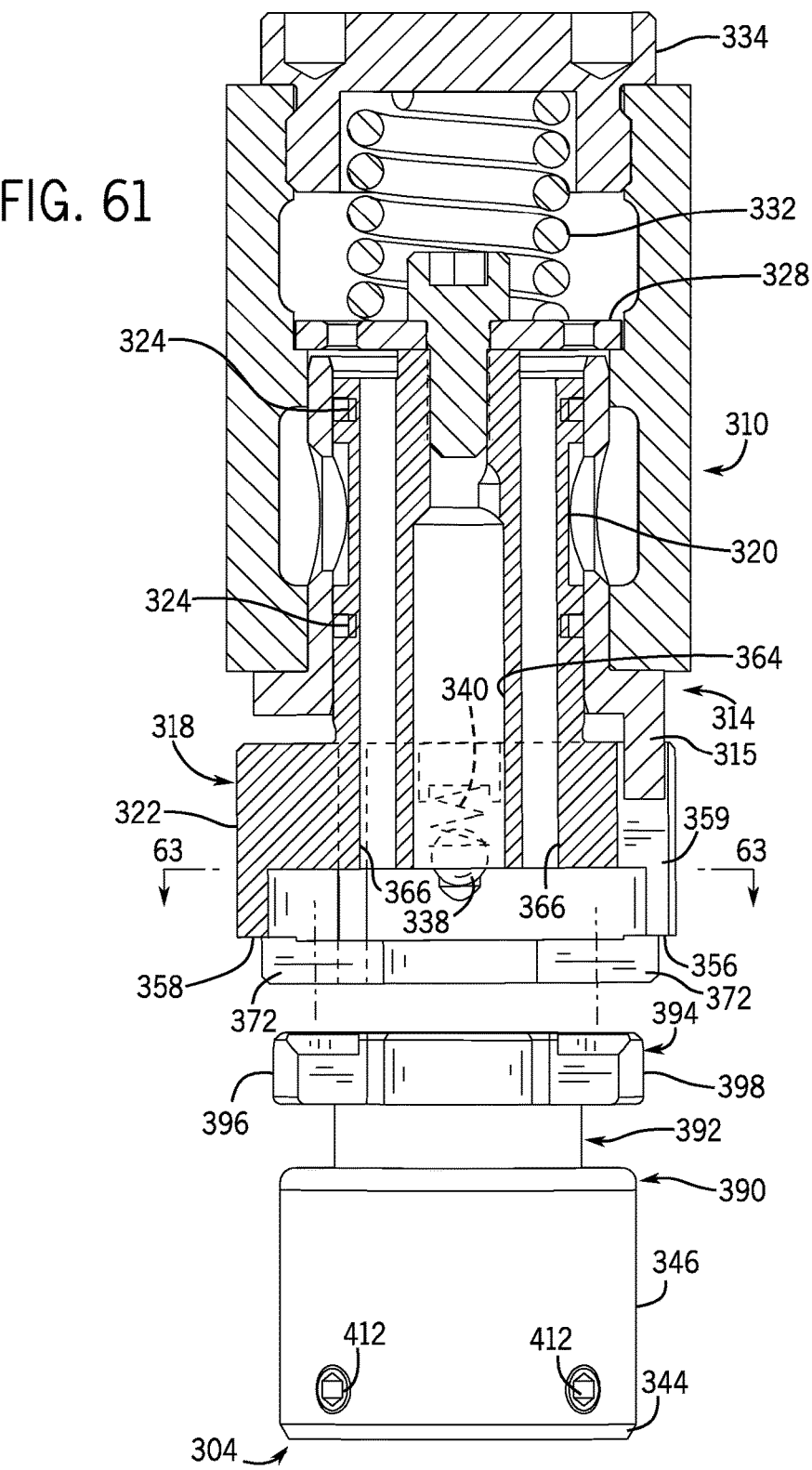
FIG. 61 is a cross-sectional view showing the blow head assembly illustrated in FIGS. 46 through 54 about to be inserted into the lock ring segment of the slider assembly illustrated in FIGS. 40 through 45, and also showing a number of the components of the blow head arm to which the slider assembly illustrated in FIGS. 40 thorough 45 are installed.

Referring next to FIGS. 61 through 63, the insertion of the blow head mounting portion 394 of the blow head assembly 304 into the lock ring 322 of the slider assembly 318 is shown. The blow head mounting portion 394 including the locking flanges 396 and 398 are inserted through the opening between the arcuate engagement flanges 370 and 372 in the lock ring 322 of the slider assembly 318 and into the interior thereof. The opening between the arcuate engagement flanges 370 and 372 are configured to admit the blow head mounting portion 394 therebetween.

Referring now to FIGS. 64 through 66, the rotation of the blow head mounting portion 394 of the blow head assembly 304 within the lock ring 322 of the slider assembly 318 from the inserted position that it is in following the process illustrated in FIGS. 61 through 63 is shown. As the blow head 304 is rotated, the angled corners on top of the locking flanges 396 and 398 at the edges thereof come into contact with the detent balls 338, as shown in detail in FIG. 65. As the blow head 304 continues to be rotated, the angled corners on top of the locking flanges 396 and 398 will force the detent balls 338 upwardly against the force exerted by the springs 340.

Referring next to FIGS. 67 through 71, the installed and locked position of the blow head mounting portion 394 of the blow head assembly 304 within the lock ring 322 of the slider assembly 318 is shown. The blow head mounting portion 394 of the blow head assembly 304 continues to be rotated with the locking flanges 396 and 398 of the blow head mounting portion 394 located on top of the arcuate engagement flanges 370 and 372 in the lock ring segment 322. When the blow head mounting portion 394 of the blow head assembly 304 has been rotated 90 degrees following its insertion into the interior of the lock ring 322, the detent recesses 406 and 408 of the locking flanges 396 and 398, respectively, of the blow head mounting portion 394 are aligned with the detent balls 338, which are urged by the spring 340 into the detent recesses 406 and 408, thereby retaining the locking flanges 396 and 398 of the blow head mounting portion 394 in the position in which it is shown in FIGS. 67 through 71. In this regard, the detent balls 338 and the detent recesses 406 and 408 can be collectively thought of as engageable retaining mechanisms. This will retain the blow head assembly 304 in place on the blow head arm assembly 300. In fact, rotation of the blow head mounting portion 394 of the blow head assembly 304 more than 90 degrees is prevented by the roll pin 326 blocking the locking flange 398, as best shown in FIG. 69.

It will be appreciated that the installation of the blow head assembly 304 on the blow head arm assembly 300 can be performed with one hand of an operator, and that no tools are required to install the blow head assembly 304. Removal of the blow head assembly 304 can be accomplished in similar fashion, since the detent recesses 406 and 408 are also angled to allow the blow head assembly 304 to be rotated, with sufficient force to push the detent balls 338 upwardly against the force of the springs 340.

Referring finally to FIG. 72, additional detail is provided showing the venting screws 412 used to exhaust cooling air from the blow head 304. In order to vary the amount of cooling air vented from the blow head 304, venting screws 412 having different inner diameters can be exchanged to vary to cooling air flow therethrough. Alternately, a valving arrangement could be included in the design of the venting screws 412 and/or the apertures 410 in the blow head mounting portion 394 that would vary the cooling air flow therethrough by rotating the venting screws 412.

It may therefore be appreciated from the above detailed description of the preferred embodiment of the present invention that it provides apparatus and a related method to facilitate the installation and removal of blow heads onto their respective blow head mounting members. In this regard, the lock ring mounting arrangement apparatus and method of the present invention does not require tools to remove and replace the blow heads, and further facilitates the removal and installation of blow heads using only a single hand. Additionally, the lock ring mounting arrangement apparatus and method also provides a preload to prevent slackness in the blow heads with respect to the blow head mounting members, thereby preventing vibration during oscillation of the blow heads as well as reducing wear on the blow heads. Finally, the lock ring mounting arrangement apparatus and method of the present invention achieves numerous advantages without incurring any substantial relative disadvantage.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

What is claimed is:

1. A blow head mounting arrangement for use with a blow head arm onto which multiple blow heads will be installed, the blow head mounting arrangement comprising:
   a blow head having a first engagement member located on a top of the blow head, wherein the first engagement member comprises:
   a blow head mounting element connected to the blow head by a blow head neck;

a second engagement member located under the blow head arm, wherein the second engagement member comprises:
a lock ring member having a hollow interior portion with a pair of opposed engagement flanges located at a bottom of the lock ring member and defining an opening therebetween;
wherein the first and second engagement members are respectively arranged and configured to allow the first engagement member of the blow head to be raised and admitted to or lowered and withdrawn from the second engagement member when the blow head is in a first rotational position with respect to the second engagement member; and
wherein the first and second engagement members are respectively arranged and configured to allow the first engagement member of the blow head to be locked in the second engagement member when the blow head is rotated from the first rotational position with respect to the second engagement member to a second rotational position with respect to the second engagement member while the first engagement member of the blow head is admitted to the second engagement member;
a spring-loaded retaining mechanism for removably maintaining the blow head in the second rotational position with respect to the second engagement member, wherein the retaining mechanism comprises:
a first retaining mechanism located in the blow head mounting element; and
a second retaining mechanism located in the lock ring member;
wherein the first retaining mechanism located in the blow head mounting element comprises:
a pair of locking flanges extending from opposite sides of the blow head mounting element; and
wherein the second retaining mechanism located in the lock ring member comprises:
a pair of detent recesses respectively located in the opposed engagement flanges in the lock ring member, the detent recesses being configured to engage the locking flanges when the blow head is in the second rotational position with respect to the second engagement member;
wherein the lock ring member comprises an upper lock ring member and a lower lock ring member defining the hollow interior portion therebetween, the opposed engagement flanges being located at a bottom of the lower lock ring member, and wherein the retaining mechanism additionally comprises:
a spring member biasing the upper lock ring member toward the opposed engagement flanges in the lower lock ring member; and
wherein the upper lock ring member includes a skirt bounding a receiving region of the hollow interior portion, the receiving region arranged such that the locking flanges of the blow head mounting element and the opposed engagement flanges located at the bottom of the lower lock ring member are received within the receiving region bounded by the upper lock ring member in the second rotational position, the opposed engagement flanges extending through notches formed in the skirt of the upper lock ring member to reach the receiving region.

2. A blow head mounting arrangement as defined in claim 1, wherein the second rotational position of the blow head is ninety degrees from the first rotational position of the blow head.

3. A blow head mounting arrangement as defined in claim 1, wherein the retaining mechanism comprises:
a detent mechanism for arresting or resisting rotation of the blow head mounting element with respect to the lock ring member when the blow head is in the second rotational position.

4. A blow head mounting arrangement as defined in claim 1, wherein one of the first and second retaining members comprises:
at least one detent recess; and
wherein the other of the first and second retaining members comprises:
at least one detent engagement member for selectively engaging the detent recess.

5. A blow head mounting arrangement as defined in claim 4, wherein the at least one detent recess is located in the blow head mounting element, and wherein the at least one detent engagement member is located in the lock ring member.

6. A blow head mounting arrangement as defined in claim 4, wherein the at least one detent recess is located in the lock ring member, and wherein the at least one detent engagement member is located in the blow head mounting element.

7. A blow head mounting arrangement as defined in claim 1, wherein the sides of the locking flanges of the blow head mounting element are angled on the bottom sides thereof to facilitate the locking flanges being engaged by the opposed engagement flanges in the lock ring member as the blow head mounting element is initially rotated from the first rotational position with respect to the second engagement member toward the second rotational position with respect to the second engagement member.

8. A blow head mounting arrangement as defined in claim 1, additionally comprising:
a limiting member for preventing the blow head from being rotated beyond the second rotational position with respect to the second engagement member.

9. A blow head mounting arrangement for use with a blow head arm onto which multiple blow heads will be installed, the blow head mounting arrangement comprising:
a blow head having a blow head mounting element connected thereto on top of the blow head, the blow head mounting element having a pair of locking flanges extending from opposite sides thereof;
a lock ring member located at a bottom of the blow head arm, the lock ring member having a hollow interior portion and a pair of opposed engagement flanges located at a bottom of the lock ring member which define an opening therebetween, the lock ring member formed by an upper lock ring member and a lower lock ring member, the hollow interior portion defined between the upper and lower lock ring members, the opposed engagement flanges being formed on the lower lock ring member and extending through notches formed in a skirt of the upper lock ring member to reach the hollow interior portion;
a pair of detent recesses respectively located in the opposed engagement flanges in the lock ring member;
wherein the blow head mounting element with its locking flanges and the opening between the engagement flanges of the lock ring member are respectively arranged and configured to allow the blow head mounting element to be raised and admitted to or lowered and withdrawn from the lock ring member when the blow head is in a first rotational position with respect to the lock ring member; and wherein the locking flanges of the blow head mounting element and the engagement flanges of the lock ring member are respectively arranged and configured to allow the blow head mounting element to be locked in the locking ring member when the blow head is rotated from the first rotational position with respect to the second engagement member to a second rotational position with respect to the locking ring member while the locking flanges of the blow head mounting element are admitted to the hollow interior portion of the lock ring member; and a spring-loaded detent mechanism for releasably arresting or resisting rotation of the blow head in the second rotational position with respect to the lock ring member, the detent recesses being configured to engage the locking flanges when the blow head is in the second rotational position with respect to the second engagement member.

10. A method of mounting a blow head onto a blow head arm, comprising:

providing a first engagement member located on a top of the blow head, wherein the first engagement member comprises a blow head mounting element connected to the blow head by a blow head neck;

providing a second engagement member located under the blow head arm wherein the second engagement member comprises a lock ring member having a hollow interior portion with a pair of opposed engagement flanges located at a bottom of the lock ring member and defining an opening therebetween;

inserting the first engagement member of the blow head into the second engagement member with the blow head in a first rotational position with respect to the second engagement member;

rotating the blow head from the first rotational position with respect to the second engagement member to a second rotational position with respect to the second engagement member while the first engagement member of the blow head is admitted to the second engagement member;

removably retaining the blow head in the second rotational position with respect to the second engagement member with a spring-loaded retaining mechanism comprising a first retaining mechanism located in the blow head mounting element and a second retaining mechanism located in the lock ring member;

selectively disengaging the retaining mechanism and rotating the blow head from the second rotational position with respect to the second engagement member to the first rotational position with respect to the second engagement member;

withdrawing the first engagement member of the blow head from the second engagement member with the blow head in the first rotational position with respect to the second engagement member to disengage the blow head from the second engagement member;

wherein the first engagement member comprises a blow head mounting element connected to the blow head by a blow head neck, and wherein the second engagement member comprises a lock ring member having a hollow interior portion with a pair of opposed engagement flanges located at a bottom of the lock ring member and defining an opening therebetween, the lock ring member including an upper lock ring member and a lower lock ring member with the hollow interior portion defined therebetween, and wherein the pair of opposed engagement flanges are formed on the lower lock ring member and extend through notches formed in a skirt of the upper locking member, the skirt defining a receiving region of the hollow interior portion arranged to receive the pair of oppose engagement flanges; and wherein the removably retaining step includes situating the pair of opposed engagement flanges and the blow head mounting element within the receiving region of the hollow interior space.

11. A method as defined in claim 10, wherein the removably retaining step comprises:

arresting or resisting rotation of the blow head mounting element with respect to the lock ring member when the blow head is in the second rotational position with a detent mechanism.

12. A method as defined in claim 10, wherein the removably retaining step comprises:

providing a first retaining mechanism located in the first engagement member;

providing a second retaining mechanism located in the second engagement member;

wherein one of the first and second retaining mechanisms comprises:

at least one detent recess; and wherein the other of the first and second retaining mechanisms comprises:

at least one detent engagement member for selectively engaging the detent recess.

* * * * *